(12) United States Patent
Moriwaka et al.

(10) Patent No.: US 9,673,454 B2
(45) Date of Patent: Jun. 6, 2017

(54) SODIUM-ION SECONDARY BATTERY

(71) Applicant: SEMICONDUCTOR ENERGY LABORATORY CO., LTD., Atsugi-shi, Kanagawa-ken (JP)

(72) Inventors: Tamae Moriwaka, Kanagawa (JP); Satoshi Seo, Kanagawa (JP); Takuya Hirohashi, Kanagawa (JP); Kunio Hosoya, Kanagawa (JP); Shunsuke Adachi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 425 days.

(21) Appl. No.: 14/180,573

(22) Filed: Feb. 14, 2014

(65) Prior Publication Data
US 2014/0234700 A1    Aug. 21, 2014

(30) Foreign Application Priority Data

Feb. 18, 2013 (JP) ................................. 2013-029527

(51) Int. Cl.
*H01M 4/62*     (2006.01)
*H01M 10/0568*  (2010.01)
(Continued)

(52) U.S. Cl.
CPC .......... *H01M 4/625* (2013.01); *H01M 4/136* (2013.01); *H01M 4/587* (2013.01);
(Continued)

(58) Field of Classification Search
None
See application file for complete search history.

(56) References Cited

U.S. PATENT DOCUMENTS 4,302,518 A    11/1981  Goodenough et al.
4,668,595 A    5/1987   Yoshino et al.
(Continued)

FOREIGN PATENT DOCUMENTS

CN    101562248 A    10/2009
EP    0913876 A      5/1999
(Continued)

OTHER PUBLICATIONS

"Na-ion batteries, recent advances and present challenges to become low cost energy systems" Palomares et al., Energy Environ. Sci., 2012, 5, 5884-5901.*

(Continued)

*Primary Examiner* — Lucas J. O'Donnell
(74) *Attorney, Agent, or Firm* — Nixon Peabody LLP; Jeffrey L. Costellia

(57) ABSTRACT

With a small amount of a conductive additive, an electrode for a storage battery including an active material layer which is highly filled with an active material is provided. The use of the electrode enables fabrication of a storage battery having high capacity per unit volume of the electrode. By using graphene as a conductive additive in an electrode for a storage battery including a positive electrode active material, a network for electron conduction through graphene is formed. Consequently, the electrode can include an active material layer in which particles of an active material are electrically connected to each other by graphene. Therefore, graphene is used as a conductive additive in an electrode for a sodium-ion secondary battery including an active material with low electric conductivity, for example, an active material with a band gap of 3.0 eV or more.

16 Claims, 8 Drawing Sheets

(51) Int. Cl.
  *H01M 4/58* (2010.01)
  *H01M 4/136* (2010.01)
  *H01M 10/054* (2010.01)
  *H01M 4/587* (2010.01)

(52) U.S. Cl.
  CPC ....... *H01M 4/5825* (2013.01); *H01M 10/054* (2013.01); *H01M 10/0568* (2013.01)

(56) References Cited

U.S. PATENT DOCUMENTS

| | | |
|---|---|---|
| 5,720,859 A | 2/1998 | Czubarow et al. |
| 5,770,018 A | 6/1998 | Saidi |
| 5,783,333 A | 7/1998 | Mayer |
| 5,871,866 A | 2/1999 | Barker et al. |
| 5,910,382 A | 6/1999 | Goodenough et al. |
| 5,951,831 A | 9/1999 | Godber et al. |
| 5,985,237 A | 11/1999 | Lu et al. |
| 6,085,015 A | 7/2000 | Armand et al. |
| 6,348,182 B1 | 2/2002 | Lu et al. |
| 6,514,640 B1 | 2/2003 | Armand et al. |
| 6,872,492 B2 | 3/2005 | Barker et al. |
| 7,060,238 B2 | 6/2006 | Saidi et al. |
| 7,179,561 B2 | 2/2007 | Niu et al. |
| 7,658,901 B2 | 2/2010 | Prud'Homme et al. |
| 7,745,047 B2 | 6/2010 | Zhamu et al. |
| 8,317,984 B2 | 11/2012 | Gilje |
| 2001/0010807 A1 | 8/2001 | Matsubara |
| 2002/0102459 A1 | 8/2002 | Hosoya et al. |
| 2002/0195591 A1 | 12/2002 | Ravet et al. |
| 2004/0016632 A1 | 1/2004 | Barker |
| 2005/0121307 A1 | 6/2005 | Hargett et al. |
| 2006/0051671 A1 | 3/2006 | Thackeray et al. |
| 2007/0009799 A1 | 1/2007 | Zheng |
| 2007/0131915 A1 | 6/2007 | Stankovich et al. |
| 2008/0048153 A1 | 2/2008 | Naoi |
| 2008/0254296 A1 | 10/2008 | Handa et al. |
| 2009/0110627 A1 | 4/2009 | Choi et al. |
| 2009/0117020 A1 | 5/2009 | Manthiram et al. |
| 2009/0117467 A1 | 5/2009 | Zhamu et al. |
| 2009/0123850 A1 | 5/2009 | Takeuchi et al. |
| 2009/0184296 A1 | 7/2009 | Isono et al. |
| 2009/0253045 A1 | 10/2009 | Kotato et al. |
| 2009/0305135 A1 | 12/2009 | Shi et al. |
| 2010/0035093 A1 | 2/2010 | Ruoff et al. |
| 2010/0055025 A1 | 3/2010 | Jang et al. |
| 2010/0081057 A1 | 4/2010 | Liu et al. |
| 2010/0086855 A1 | 4/2010 | Kohmoto et al. |
| 2010/0105834 A1 | 4/2010 | Tour et al. |
| 2010/0143798 A1 | 6/2010 | Zhamu et al. |
| 2010/0176337 A1 | 7/2010 | Zhamu et al. |
| 2010/0203389 A1 | 8/2010 | Yoshida |
| 2010/0233546 A1 | 9/2010 | Nesper et al. |
| 2010/0248034 A1 | 9/2010 | Oki et al. |
| 2010/0301279 A1 | 12/2010 | Nesper et al. |
| 2010/0303706 A1 | 12/2010 | Wallace et al. |
| 2010/0304217 A1 | 12/2010 | Suzuki et al. |
| 2010/0308277 A1 | 12/2010 | Grupp et al. |
| 2010/0323231 A1 | 12/2010 | Sakai et al. |
| 2010/0330421 A1 | 12/2010 | Cui et al. |
| 2011/0008233 A1 | 1/2011 | Miyanaga et al. |
| 2011/0012067 A1 | 1/2011 | Kay |
| 2011/0031105 A1 | 2/2011 | Miyanaga |
| 2011/0111303 A1 | 5/2011 | Kung et al. |
| 2011/0121240 A1 | 5/2011 | Amine et al. |
| 2011/0136019 A1 | 6/2011 | Amiruddin et al. |
| 2011/0159372 A1 | 6/2011 | Zhamu et al. |
| 2011/0227000 A1 | 9/2011 | Ruoff et al. |
| 2012/0045688 A1* | 2/2012 | Liu ................. H01G 11/06 429/207 |
| 2012/0045692 A1 | 2/2012 | Takemura et al. |
| 2012/0058397 A1 | 3/2012 | Zhamu et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0100402 A1 | 4/2012 | Nesper et al. |
| 2012/0305855 A1* | 12/2012 | Kim ................. H01M 4/136 252/506 |
| 2012/0308884 A1 | 12/2012 | Oguni et al. |
| 2012/0308891 A1 | 12/2012 | Todoriki et al. |
| 2012/0315550 A1 | 12/2012 | Liu et al. |
| 2013/0017443 A1 | 1/2013 | Yamazaki |
| 2013/0045418 A1 | 2/2013 | Oguni et al. |
| 2013/0084384 A1 | 4/2013 | Yamakaji |
| 2013/0266859 A1 | 10/2013 | Todoriki et al. |
| 2013/0266869 A1 | 10/2013 | Todoriki et al. |

FOREIGN PATENT DOCUMENTS

| | | |
|---|---|---|
| JP | H06-060870 A | 3/1994 |
| JP | H08-037007 A | 2/1996 |
| JP | 2002-110162 A | 4/2002 |
| JP | 2003-238131 A | 8/2003 |
| JP | 2008-260666 A | 10/2008 |
| JP | 2011-048992 A | 3/2011 |
| JP | 2011-105569 A | 6/2011 |
| WO | WO-2006/071076 A1 | 7/2006 |
| WO | WO-2011/141486 A1 | 11/2011 |

OTHER PUBLICATIONS

Shao Y., et al., Facile and controllable electrochemical reduction of graphene oxide and its applications, J. Mater, Chem., 2010, vol. 20, Issue 4, pp. 743-748.

Burba C., "Vibrational spectroscopic investigation of structurally-related LiFePO4, NaFePO4, and FePO4 compounds", Spectrochimica Acta Part A, 2006, vol. 65, Issue 1, pp. 44-50.

Kang B. et al., Battery materials for ultrafast charging and discharging, *Nature*, 2009, vol. 458, No. 7235, pp. 190-193.

Yang S. et al., "Hydrothermal synthesis of lithium iron phosphate cathodes", *Electrochem. Commun.*, 2001, vol. 3, Issue 9, pp. 505-508.

Chan C. et al., "High-performance lithium battery anodes using silicon nanowires", *Nature Nanotech.*, 2008, vol. 3, pp. 31-35.

Padhi A. et al., "Phospho-olivines as Positive-Electrode Materials for Rechargeable Lithium Batteries", *J. Electrochem. Soc.*, 1997, vol. 144, No. 4, pp. 1188-1194.

Zhou X. et al., "Graphene modified LiFePO4 cathode materials for high power lithium ion batteries", *J. Mater. Chem.*, 2011, vol. 21, pp. 3353-3358.

Sundaram R. et al., "Electrochemical Modification of Graphene", *Adv. Mater.*, 2008, vol. 20, Issue 16, pp. 3050-3053.

Zhou M. et al., "Controlled Synthesis of Large-Area and Patterned Electrochemically Reduced Graphene Oxide Films", *Chem. Eur. J.*, 2009, vol. 15, Issue 25, pp. 6116-6120.

Paek S. et al., "Enhanced Cyclic Performance and Lithium Storage Capacity of SnO2/Graphene Nanoporous Electrodes with Three-Dimensionally Delaminated Flexible Structure", *Nano Lett.*, 2009, vol. 9, Issue 1, pp. 72-75.

Wang G. et al., "Sn/graphene nanocomposite with 3D architecture for enhanced reversible lithium storage in lithium ion batteries", *J. Mater. Chem.*, 2009, vol. 19, Issue 44, pp. 8378-8384.

Wang D. et al., "Self-Assembled TiO2-Graphene Hybrid Nanostructures for Enhanced Li-Ion Insertion", *ACS NANO*, 2009, vol. 3, No. 4, pp. 907-914.

Shao Y. et al., "Facile and controllable electrochemical reduction of graphene oxide and its applications", *J. Mater. Chem.*, 2010, vol. 20, pp. 743-748.

Su.F et al., "Flexible and planar graphene conductive additives for lithium-ion batteries", *J. Mater. Chem.*, 2010, vol. 20, Issue 43, pp. 9644-9650.

Yu G. et al., "Solution-Processed Graphene/MnO2 Nanostructured Textiles for High-Performance Electrochemical Capacitors", *Nano Lett.*, 2011, vol. 11, Issue 7, pp. 2905-2911.

Todoriki H. et al., "High performance lithium ion battery using Graphene Net electrode", 222nd ECS Meeting Abstract, Oct. 7, 2012, p. 1014.

(56) References Cited

OTHER PUBLICATIONS

Burba C. et al., "Vibrational spectroscopic investigaion of structurally-related LiFePO4, NaFePO4, and FePO4 compounds", *Spectrochimica Acta Part A*, 2006, vol. 65, Issue 1, pp. 44-50.

Feng P. et al., "Synthesis and Characterizations of a Polymorphic Sodium Cobalt Phosphate with Edge-Sharing CO2+ Octahedral Chains", *J. Solid State Chem.*, 1997, vol. 131, Issue 1, pp. 160-166.

Feng P. et al., "Synthesis, Crystal Structure, and Magnetic Properties of a New Polymorphic Sodium Cobalt Phosphate with Trigonal Bipyramidal CO2+ and a Tunnel Structure", *J. Solid State Chem.*, 1997, vol. 129, Issue 2, pp. 328-333.

Erragh F. et al., "Sodium Nickel Polyphosphate", *Acta. Cryst.*, 1998, vol. C54, Issue 12, pp. 1746-1747.

Wang Z. et al., "Direct Electrochemical Reduction of Single-Layer Graphene Oxide and Subsequent Functionalization with Glucose Oxidase", *J. Phys. Chem. C*, 2009, vol. 113, No. 32, pp. 14071-14075.

Murugan A. et al., "One-pot microwave-hydrothermal synthesis and characterization of carbon-coated LiMPO4(M=Mn, Fe, and Co) Cathodes", *J. Electrochem. Soc.*, 2009, vol. 156, Issue 2, pp. A79-A83.

Chen J. et al., "Hydrothermal synthesis of cathode materials", *J. Power Sources*, 2007, vol. 174, Issue 2, pp. 442-448.

Mattevi C. et al., "Evolution of Electrical, Chemical, and Structural Properties of Transparent and Conducting Chemically Derived Graphene Thin Films", *Adv. Funct. Mater.*, 2009, vol. 19, Issue. 16, pp. 2577-2583.

Zhang H. et al., "Vacuum-assisted synthesis of graphene from thermal exfoliation and reduction of graphite oxide", *J. Mater. Chem.*, 2011, vol. 21, Issue 14, pp. 5392-5397.

Park S. et al., "Hydrazine-reduction of graphite-and graphene oxide", *Carbon*, 2011, vol. 49, Issue 9, pp. 3019-3023.

Dreyer D. et al., "The chemistry of graphene oxide", *Chem. Soc. Rev.*, 2010, vol. 39, Issue 1, pp. 228-240.

Ellis B. et al., "A multifunctional 3.5 V iron-based phosphate cathode for rechargeable batteries", *Nature Mater.*, 2007, vol. 6, Issue 10, pp. 749-753.

Kawabe Y. et al., "Synthesis and electrode performance of carbon coated Na2FePO4F for rechargeable Na batteries", *Electrochem. Commun.*, 2011, vol. 13, Issue 11, pp. 1225-1228.

* cited by examiner

Na ◯  Fe ●  O ◯  P ◯  F ◯

SODIUM-ION SECONDARY BATTERY

BACKGROUND OF THE INVENTION

1. Field of the Invention

The present invention relates to an object, a method, or a manufacturing method. In addition, the present invention relates to a process, a machine, manufacture, or a composition of matter. In particular, the present invention relates to, for example, a power storage device, a semiconductor device, a display device, a light-emitting device, a driving method thereof, or a fabrication method thereof. In particular, the present invention relates to, for example, an electrode for a storage battery and a method for forming the electrode for a storage battery.

2. Description of the Related Art

With the recent rapid spread of portable electronic devices such as mobile phones, smartphones, electronic book (e-book) readers, and portable game machines, secondary batteries for drive power sources have been increasingly required to be smaller and to have higher capacity. Storage batteries typified by lithium-ion secondary batteries, which have advantages such as high energy density and high capacity, have been widely used as secondary batteries used for portable electronic devices.

Further, there is a significant effect on social living and personal lives when power supply equipment malfunctions or is partly broken and an electric power company stops or restricts power supply because of natural disasters or accidents. For this reason, demand for floor-mounted (stationary) storage batteries that can secure electric energy has grown.

A lithium-ion secondary battery, which is one of storage batteries and widely used because of its high energy density, includes a positive electrode including an active material such as lithium cobalt oxide ($LiCoO_2$) or lithium iron phosphate ($LiFePO_4$), a negative electrode formed of a carbon material such as graphite capable of occlusion and release of lithium ions, a nonaqueous electrolytic solution in which an electrolyte formed of a lithium salt such as $LiBF_4$ or $LiPF_6$ is dissolved in an organic solvent such as ethylene carbonate (EC) or diethyl carbonate (DEC), for example. The lithium-ion secondary battery is charged and discharged in such a way that lithium ions in the secondary battery move between the positive electrode and the negative electrode through the nonaqueous electrolytic solution and inserted into or extracted from the active materials of the positive electrode and the negative electrode.

In recent years, attention has been focused on a sodium-ion secondary battery because sodium is a naturally abundant element. In the sodium-ion secondary battery, an electrode material including sodium is used, and sodium ions move between a positive electrode and a negative electrode to enable a battery reaction.

Lithium iron phosphate used as a positive electrode active material is also referred to as a polyanionic compound. The polyanionic compound refers to a compound with a structure in which oxyanions are three-dimensionally bonded to each other. Such a polyanionic compound has high cell potential but tends to have low electric conductivity.

In an electrode used in a battery, it is important to form a path for favorable electric conduction from a current collector to an active material on an electrode surface. Low electric conductivity of the electrode impairs cycle performance of the battery or reduces a discharging rate.

In view of the above, to increase electric conductivity between a positive electrode current collector and a positive electrode active material, for example, particles of acetylene black (AB) or graphite (black lead) having higher electric conductivity than the positive electrode active material are mixed as a conductive additive, which increases electric conductivity between particles of the active material or between particles of the active material and the current collector (see Patent Document 1).

REFERENCE

Patent Document

[Patent Document 1] Japanese Published Patent Application No. 2002-110162

SUMMARY OF THE INVENTION

In an electrode used in a battery, a positive electrode current collector and a positive electrode active material which are in contact with each other and a conductive additive form a path for electric conduction. Particularly in the case of a positive electrode active material with low electric conductivity, a path with low resistance cannot be formed without a large amount of a conductive additive. However, acetylene black used as the conductive additive is high volume particles having an average particle diameter of several tens of nanometers to several hundreds of nanometers, and therefore is difficult to be in surface contact but is easily in point contact with an active material. Consequently, contact resistance between the active material and the conductive additive is high. On the other hand, when the amount of the conductive additive is increased to increase contact points between the active material and the conductive additive, the ratio of the active material in the electrode is reduced, resulting in a reduction in discharge capacity of the battery.

In the case where graphite particles are used as a conductive additive, natural graphite is generally used in consideration of cost. In such a case, iron, lead, or copper contained as an impurity in a graphite particle reacts with an active material or a current collector, which might reduce the potential or capacity of a battery.

In view of the above problems, an object of one embodiment of the present invention is to provide an electrode for a storage battery in which electric conductivity between particles of an active material or between particles of the active material and a current collector is increased. Another object of one embodiment of the present invention is to provide a storage battery with high capacity per volume of an electrode by using the electrode for a storage battery. Another object of one embodiment of the present invention is to provide a storage battery with high discharge capacity. Another object of one embodiment of the present invention is to provide a storage battery with improved cycle performance. Another object of one embodiment of the present invention is to provide a storage battery with an increased discharging rate. Another object of one embodiment of the present invention is to provide a storage battery that is less likely to deteriorate. Another object of one embodiment of the present invention is to provide a storage battery in which generation of irreversible capacity is inhibited. Another object of one embodiment of the present invention is to provide a novel electrode for a storage battery. Another object of one embodiment of the present invention is to provide a novel storage battery. Note that the descriptions of these objects do not disturb the existence of other objects. In one embodiment of the present invention, there is no need to achieve all the objects. Other objects will be apparent from and can be derived from the description of the specification, the drawings, the claims, and the like.

In view of the above objects, graphene is used as a conductive additive in an electrode for a storage battery including a positive electrode active material with low electric conductivity. Accordingly, a network for electric conduction through graphene is formed. Thus, an electrode for a storage battery including an active material layer with high electric conductivity in which particles of an active material are electrically connected to each other by graphene can be formed.

One embodiment of the present invention is an electrode for a storage battery including an active material with low electric conductivity, such as an active material with a band gap of 3.0 eV or more, and graphene as a conductive additive.

Another embodiment of the present invention is an electrode for a storage battery including graphene and an active material that contains sodium.

Another embodiment of the present invention is an electrode for a storage battery in which an active material is one or more of $Na_3Ti_2(PO_4)_2F_3$, $Na_3V_2(PO_4)_2F_3$, $Na_3Fe_2(PO_4)_2F_3$, $Na_2FePO_4F$, $Na_2MnPO_4F$, $NaNi_3(PO_4)_2P_2O_7$, $NaCo_3(PO_4)_2P_2O_7$, and $NaMn_3(PO_4)_2P_2O_7$.

Another embodiment of the present invention is an electrode for a storage battery in which the interlayer distance between graphene layers is 0.34 nm or greater and 0.5 nm or less.

Graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, graphene has been expected to be used for a variety of fields of, for example, field-effect transistors with high mobility, highly sensitive sensors, highly-efficient solar cells, and next-generation transparent conductive films and has attracted a great deal of attention.

Graphene in this specification refers to single-layer graphene or multilayer graphene including two or more and a hundred or less layers. The single-layer graphene refers to a sheet of one atomic layer of carbon molecules having π bonds. Further, graphene oxide (GO) refers to a compound formed by oxidation of graphene. When graphene oxide is reduced to form graphene, oxygen contained in the graphene oxide is not entirely extracted and part of the oxygen remains in the graphene. When the graphene contains oxygen, the ratio of the oxygen measured by X-ray photoelectron spectroscopy (XPS) in the graphene is more than or equal to 2 atomic % and less than or equal to 20 atomic %, preferably more than or equal to 3 atomic % and less than or equal to 15 atomic %.

In the case of multilayer graphene including graphene obtained by reducing graphene oxide, the interlayer distance between the graphene layers is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphene layers is 0.34 nm. Since the interlayer distance between the graphene layers used for the electrode for the storage battery of one embodiment of the present invention is longer than that in the general graphite, carrier ions can easily transfer between the graphene layers in multilayer graphene.

Graphene is in contact with part of a surface of an active material. The plurality of graphene flakes are formed in such a way as to wrap or coat a plurality of particles of the active material, or be adhered to surfaces of the plurality of particles of the active material, so that the graphene flakes make surface contact with the particles of the active material. Further, the graphene flakes are also in surface contact with each other; consequently, the plurality of graphene flakes form a three-dimensional network for electronic conduction. This makes it possible to increase the electric conductivity between the particles of the active material or between particles of the active material and the current collector.

Any of the electrodes for a storage battery, which are embodiments of the present invention, can be used to fabricate a battery cell. With the use of a plurality of such battery cells, a power storage device can be fabricated.

An electrode for a storage battery in which electric conductivity between particles of an active material or between particles of the active material and a current collector is increased can be provided. The use of the electrode for a storage battery enables fabrication of a storage battery with high capacity per unit volume of the electrode.

DETAILED DESCRIPTION OF THE INVENTION

Embodiments will be described below with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Embodiment 1

In this embodiment, one mode of an electrode for a storage battery of one embodiment of the present invention is described with reference to FIGS. 1A to 1C and FIGS. 8A and 8B.

Figure 1A:
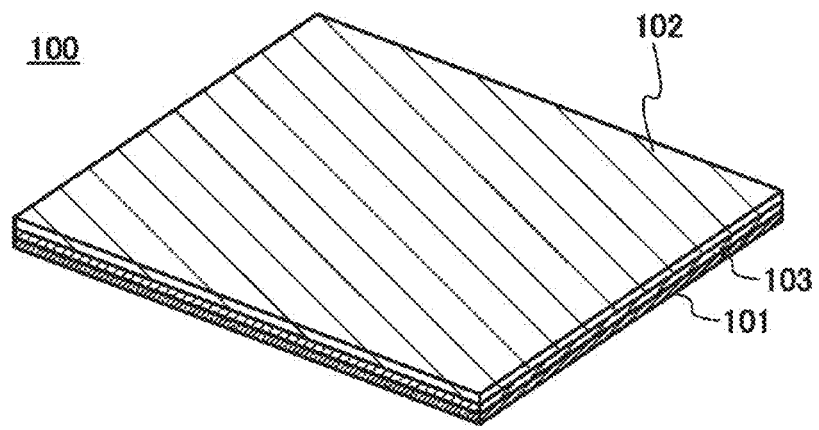
FIGS. 1A to 1C illustrate one mode of an electrode for a storage battery.
Figure 1B:
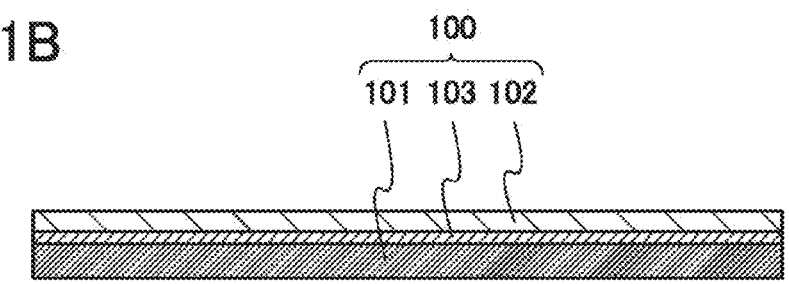

FIG. 1A is a perspective view of an electrode 100 for a storage battery, and FIG. 1B is a longitudinal cross-sectional view of the electrode 100 for the storage battery. Although the electrode 100 for the storage battery in the shape of a rectangular sheet is illustrated in FIG. 1A, the shape of the electrode 100 for the storage battery is not limited thereto and may be selected as appropriate. An active material layer 102 is formed on only one surface of a current collector 101 in FIGS. 1A and 1B; however, active material layers 102 may be formed so that the current collector 101 is sandwiched therebetween. The active material layer 102 does not necessarily need to be formed on the entire surface of the current collector 101 and a region that is not coated, such as a region for connection to an electrode tab, is provided as appropriate. As illustrated in FIGS. 1A and 1B, the electrode 100 for the storage battery preferably includes an undercoat 103 between the active material layer 102 and the current collector 101. Note that the "undercoat" refers to a coating layer formed to reduce contact resistance and increase adhesion of an interface. As the coating layer, carbon, metals, or a mixed layer including a high molecule material and carbon or metals can be used.

The current collector 101 can be formed using a highly conductive material which is not alloyed with a carrier ion such as a lithium ion, for example, a metal typified by stainless steel, gold, platinum, zinc, iron, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The current collector 101 can have, for example, a foil-like shape, a plate-like shape (sheet-like shape), a net-like shape, a cylindrical shape, a coil shape, a punching-metal shape, or an expanded-metal shape, as appropriate. The current collector 101 preferably has a thickness of greater than or equal to 10 μm and less than or equal to 30 μm.

Figure 1C:
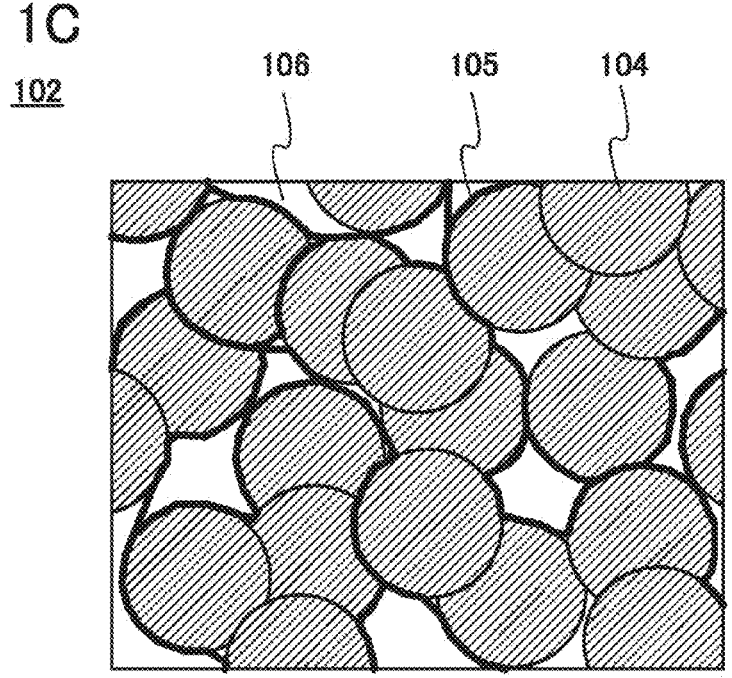

FIG. 1C is a schematic cross-sectional view of part of the active material layer 102. The active material layer 102 includes a particulate active material 104, graphene flake 105 as a conductive additive, and a binder 106.

As the active material 104, a material into and from which carrier ions, such as lithium ions or sodium ions, can be inserted and extracted is used. The active material is in the form of particles made of secondary particles with average diameter and diameter distribution, which are obtained in such a way that material compounds are mixed at a predetermined ratio and baked and the resulting baked product is crushed, granulated, and classified by an appropriate method. Therefore, the active material 104 are schematically illustrated as spheres in FIG. 1C; however, the shape of the active material is not limited thereto.

When the electrode for the storage battery is used as a positive electrode of a storage battery, examples of the active material 104 include a material with an olivine crystal structure, a material with a layered rock-salt crystal structure, and a material with a spinel crystal structure.

As the material with the olivine crystal structure, a compound represented by a general formula, $LiMPO_4$ (M is one or more of Mn(II), Co(II), and Ni(II)), can be given. Typical examples of the general formula $LiMPO_4$ include $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq 1$, $0<c<1$, $0<d<1$, and $0<e<1$), and $LiFe_fNi_gCo_hMn_iPO_4$ ($f+g+h+i\leq 1$, $0<f<1$, $0<g<1$, $0<h<1$, and $0<i<1$).

Examples of the material with the layered rock-salt crystal structure include $LiNiO_2$; $LiMnO_2$; $Li_2MnO_3$; an NiCo-based material (a general formula thereof is $LiNi_xCo_{1-x}O_2$ ($0<x<1$)) such as $LiNi_{0.8}Cu_{0.5}O_2$; an NiMn-based material (a general formula thereof is $LiNi_xMn_{1-x}O_2$ ($0<x<1$)) such as $LiNi_{0.5}Mn_{0.5}O_2$; and an NiMnCo-based material (also referred to as NMC, and a general formula thereof is $LiNi_xMn_yCo_{1-x-y}O_2$ ($x>0$, $y>0$, $x+y<1$)) such as $LiNi_{1/3}Mn_{1/3}Co_{1/3}O_2$. Moreover, the examples include $Li(Ni_{0.8}Cu_{0.15}Al_{0.05})O_2$ and $Li_2MnO_3$—$LiMO_2$ (M=Co, Ni, or Mn).

Examples of the material with the spinel crystal structure include $LiMn_2O_4$, $Li_{1+x}Mn_{2-x}O_4$, $Li(MnAl)_2P_4$, and $LiMn_{1.5}Ni_{0.5}O_4$.

It is preferable to add a small amount of lithium nickel oxide ($LiNiO_2$ or $LiNi_{1-x}MO_2$ (M=Co or Al, for example)) to a material with the spinel crystal structure which contains manganese such as $LiMn_2O_4$ because advantages such as minimization of the elution of manganese and the decomposition of an electrolytic solution can be obtained.

Alternatively, a compound represented by a general formula, $Li_{(2-j)}MSiO_4$ (M is one or more of Fe(II), Mn(II), Co(II), and Ni(II), and $0\leq j\leq 2$), can be used as the positive electrode active material. Typical examples of the general formula, $Li_{(2-j)}MSiO_4$, include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq 1$, $0<m<1$, $0<n<1$, and $0<q<1$), and $Li_{(2-j)}Fe_rNi_sCo_tMn_uSiO_4$ ($r+s+t+u\leq 1$, $0<r<1$, $0<s<1$, $0<t<1$, and $0<u<1$).

Still alternatively, a NASICON compound represented by a general formula, $A_xM_2(XO_4)_3$ (A=Li, Na, or Mg, M=Fe, Mn, Ti, V, Nb, or Al, X=S, P, Mo, W, As, or Si), can be used as the positive electrode active material. Examples of the NASICON compound include $Fe_2(MnO_4)_3$, $Fe_2(SO_4)_3$, and $Li_3Fe_2(PO_4)_3$. Still further alternatively, a compound represented by a general formula, $Li_2MPO_4F$, $Li_2MP_2O_7$, or $Li_5MO_4$ (M=Fe or Mn), a perovskite fluoride such as $NaF_3$ or $FeF_3$, a metal chalcogenide (a sulfide, a selenide, or a telluride) such as $TiS_2$ or $MoS_2$, a material with an inverse spinel crystal structure such as $LiMVO_4$, a vanadium oxide (e.g., $V_2O_5$, $V_6O_{13}$, or $LiV_3O_8$), a manganese oxide, or an organic sulfur compound can be used as the positive electrode active material, for example.

Note that among the examples of the active material 104, the material with the olivine crystal structure, the compound represented by the general formula, $Li_{(2-j)}MSiO_4$, (M is one or more of Fe(II), Mn(II), Co(II), and Ni(II), and $0\leq j\leq 2$), and the NASICON compound represented by the general formula, $A_xM_2(XO_4)_3$, (A=Li, Na, or Mg, M=Fe, Mn, Ti, V, Nb, or Al, and X=S, P, Mo, W, As, or Si) are each a polyanionic compound.

In the case where the carrier ions are alkali metal ions other than lithium ions or alkaline-earth metal ions, the following may be used as the active material 104: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides.

In the case where the carrier ions are sodium ions, an active material including sodium is preferably used.

As the active material including sodium, a transition metal sodium phosphate is preferably used. Examples of the active material including sodium include polyanionic compounds such as $Na_3M_2(PO_4)_2F_3$ (M=Ti, V, or Fe), $Na_2MPO_4F$ (M=Fe or Mn), and $NaM_3(PO_4)_2P_2O_7$ (M=Ni, Co, or Mn); layered compounds such as $Na_{2/3}Fe_{1/3}Mn_{2/3}O_2$, $NaFe_{0.4}Mn_{0.3}Ni_{0.3}O_2$, $\alpha$-$NaFeO_2$, and $NaFex(Mn_{0.5}Ni_{0.5})_{1-x}O_2$; sulfide including sodium; and fluoride including sodium.

The smaller the particle diameter of the active material 104 is, the larger the specific surface area of the active material 104 is. An active material with low carrier ion conductivity needs to have a small particle diameter in order to improve rate characteristics. Graphene is effective even in the case of using such an active material. For example, in the layered-rock salt crystal structure, such as lithium cobalt oxide, lithium can diffuse two-dimensionally and thus lithium ion conductivity is high, whereas in the olivine crystal structure, lithium diffuses one-dimensionally and thus lithium ion conductivity is low.

The average particle diameter of the primary particle of the active material 104 is less than or equal to 500 nm, preferably greater than or equal to 50 nm and less than or equal to 500 nm. To make surface contact with a plurality of particles of the active material 104, the length of one side of the graphene flake 105 is preferably greater than or equal to 50 nm and less than or equal to 100 μm, more preferably greater than or equal to 800 nm and less than or equal to 20 μm.

Here, description is given of calculation results of states of electrons in $NaFeO_2$ and $Na_2FePO_4F$.

Figure 7A:
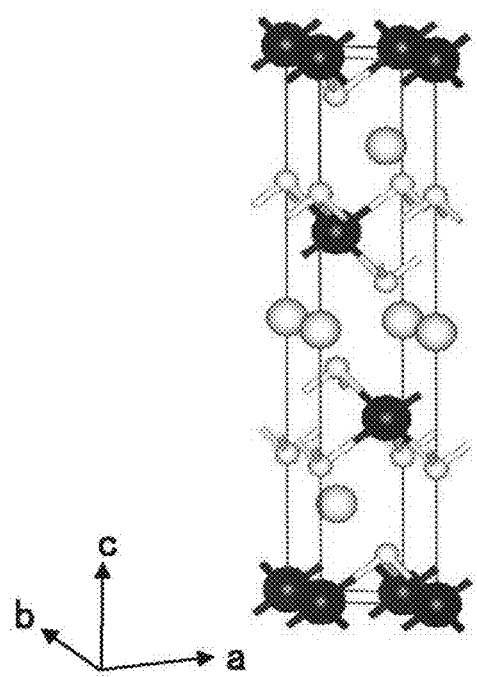
FIGS. 7A and 7B illustrate crystal structures of $NaFeO_2$ and $Na_2FePO_4F$, respectively.
Figure 7B:
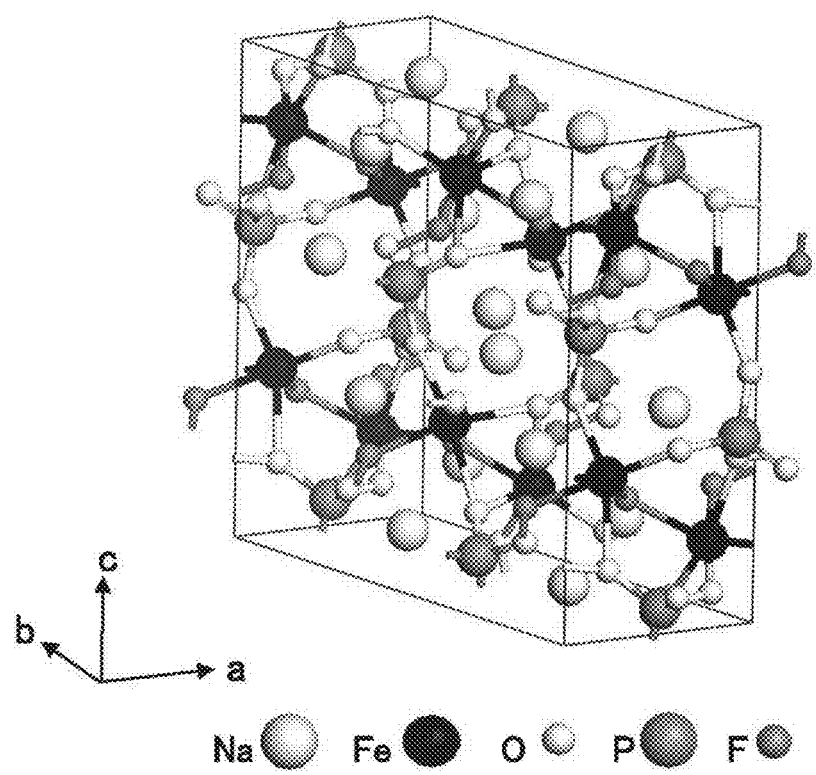

First, FIGS. 7A and 7B illustrate structures of $NaFeO_2$ and $Na_2FePO_4F$, respectively. $NaFeO_2$ in FIG. 7A includes 3 Na atoms, 3 Fe atoms, and 6 O atoms. $Na_2FePO_4F$ in FIG. 7B includes 16 Na atoms, 8 Fe atoms, 8 P atoms, 32 O atoms, and 8 F atoms.

The states of electrons in the crystal structures in FIGS. 7A and 7B were calculated in conditions described in Table 1. The Vienna Ab initio Simulation Package (VASP) was used in the calculation.

TABLE 1

| Functional | | GGA + U |
|---|---|---|
| Cut off energy | | 800 eV |
| Number of sampling points k | $NaFeO_2$ | 5 × 5 × 1 (Structural optimization) |
| | | 10 × 10 × 2 (Density of states) |
| | $Na_2FePO_4F$ | 2 × 1 × 1 (Structural optimization) |
| | | 4 × 2 × 2 (Density of states) |
| U | $NaFeO_2$ | 4.3 eV |
| | $Na_2FePO_4F$ | 4.3 eV |
| Spin polarization | | setup |

Figure 8A:
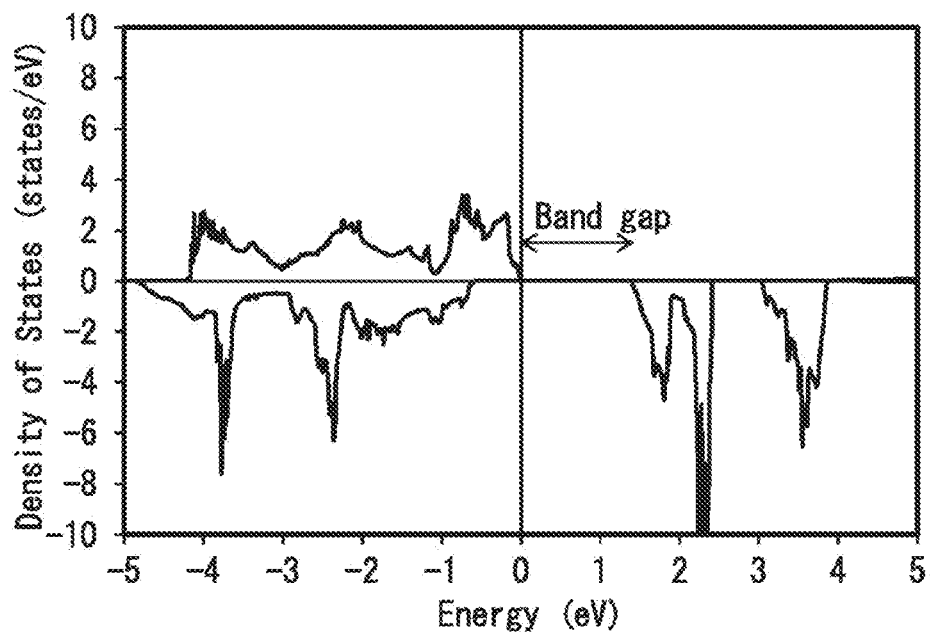
FIGS. 8A and 8B show calculation results of $NaFeO_2$ and $Na_2FePO_4$, respectively.
Figure 8B:
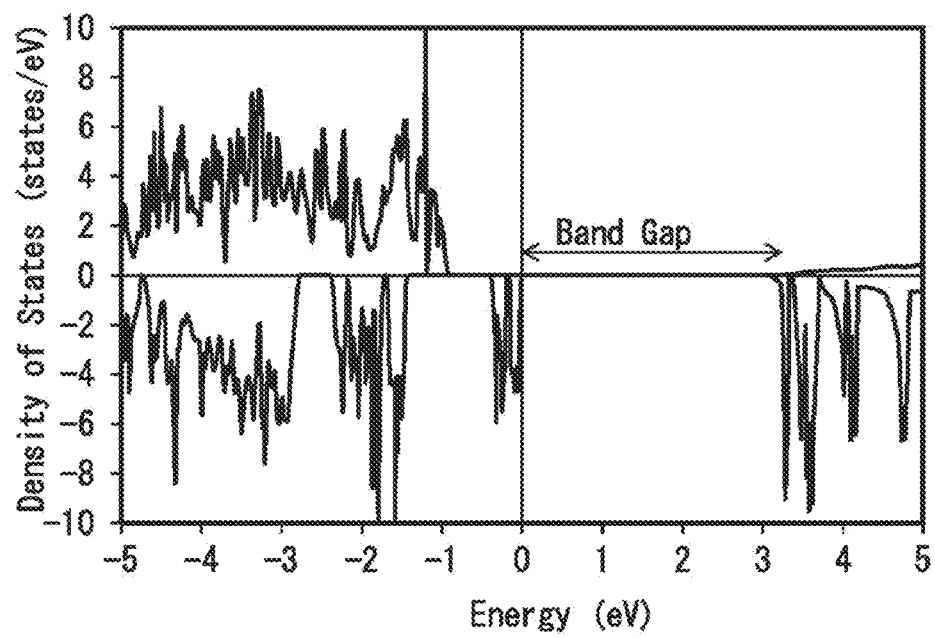

FIGS. 8A and 8B show the calculation results of the electronic density of states. FIG. 8A shows the calculation result of $NaFeO_2$; FIG. 8B shows the calculation result of $Na_2FePO_4F$. In the graphs in FIGS. 8A and 8B, the horizontal axis represents energy (eV), and the vertical axis represents density of states per composition (states/eV).

The results in FIGS. 8A and 8B show that $NaFeO_2$ has a band gap of 1.39 eV and $Na_2FePO_4F$ has a band gap of 3.01 eV.

The intrinsic carrier density $n_i$ in a semiconductor is represented by Formula 1.

[Formula 1]

$$n_i = (N_c N_v)^{1/2} e^{-Eg/2kT} \quad (1)$$

$N_c$ is the effective density of states in the conduction band and $N_v$ is the effective density of states in the valence band. Eg is a band gap; k, the Boltzmann's constant; and T, temperature. Eg is a determinative factor of $n_i$ because $n_i$ is proportional to $e^{Eg}$. The larger Eg is, the lower the intrinsic carrier density is. In addition, electric conductivity is represented by Formula (2).

[Formula 2]

$$\sigma = en\mu \quad (2)$$

E is elementary charge; n, carrier density; and t, mobility. Accordingly, when Eg becomes large, the electric conductivity tends to be lowered.

Further, in the case of using the electrode for the storage battery in FIGS. 1A to 1C as a positive electrode of a storage battery, although not illustrated, a carbon layer may be provided on a surface of the active material 104. With the carbon layer, conductivity of the electrode can be increased. The active material 104 can be coated with the carbon layer by mixing a carbohydrate such as glucose at the time of baking the active material 104.

As the binder 106, instead of polyvinylidene fluoride (PVDF) as a typical one, for example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, or nitrocellulose can be used.

The longitudinal section of the active material layer 102 in FIG. 1C illustrates substantially uniform dispersion of the sheet-like graphene flake 105 in the active material layer 102. The graphene flake 105 is schematically illustrated by a heavy line in FIG. 1C but is actually a thin film having a thickness corresponding to the thickness of a single layer or a multiple layer of carbon molecules. The graphene 105 is in contact with part of a surface of the active material 104. A plurality of graphene flakes 105 are formed in such a way as to wrap or coat a plurality of particles of the active material 104 or be adhered to surfaces of the particles of the active material 104, so that the graphene flakes 105 make surface contact with the particles of the active material 104. Further, the graphene flakes 105 are also in surface contact with each other; consequently, the plurality of graphene flakes 105 form a three-dimensional network for electronic conduction.

This is because graphene oxide with an extremely high dispersion property in a polar solvent (also referred to as dispersion medium) is used for the formation of the graphene flakes 105. A solvent is removed by volatilization from the polar solvent including graphene oxide uniformly dispersed and graphene oxide is reduced to give graphene; hence, the graphene flakes 105 remaining in the active material layer 102 partly overlap with and are dispersed such that surface contact is made, thereby forming a path for electron conduction.

Unlike a conductive additive in the form of particles, such as acetylene black, which is generally used and makes point contact with an active material, the graphene flakes 105 are capable of surface contact with low contact resistance; accordingly, the electric conductivity between the particles of the active material 104 and the graphene flakes 105 can be improved without an increase in the amount of a conductive additive. Thus, the ratio of the active material 104 in the active material layer 102 can be increased. Accordingly, the discharge capacity of a storage battery can be increased.

In an electrode for a storage battery including an active material with low electric conductivity, such as an active material with a band gap of 3.0 eV or more, preferably 3.5 eV or more, more preferably 4.0 eV or more, the use of graphene as a conductive additive can enhance the electric conductivity between particles of the active material or between particles of the active material and a current collector. The use of such an electrode improves the cycle performance and discharging rate of the storage battery.

The polyanionic compound used as a positive electrode active material has a high cell potential but tends to have low electric conductivity. For this reason, when the polyanionic compound is used as a positive electrode active material, the use of graphene as a conductive additive makes it possible to enhance the electric conductivity between particles of the active material or between particles of the active material and a current collector. The use of such an electrode improves the cycle performance and discharging rate of a storage battery.

Note that in this embodiment, the description is given of the case where the use of graphene as a conductive additive is effective when an active material with low electric conductivity, such as an active material with a band gap of 3.0 eV or more, preferably 3.5 eV or more, more preferably 4.0 eV or more is used; however, one embodiment of the present invention is not limited to this case. Even when an active material with a band gap less than 3.0 eV is used, the electric conductivity between the active material and a current collector can be further enhanced.

Next, another mode of the electrode for the storage battery of one embodiment of the present invention is described with reference to FIGS. 2A to 2C.

Figure 2A:
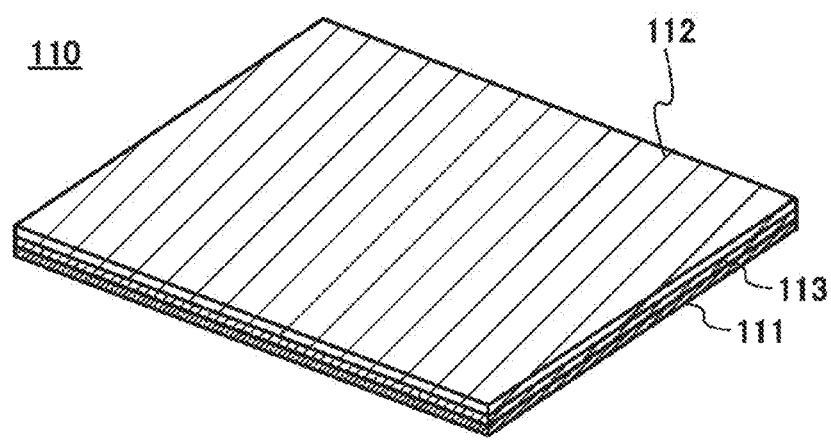
FIGS. 2A to 2C illustrate one mode of an electrode for a storage battery.
Figure 2B:
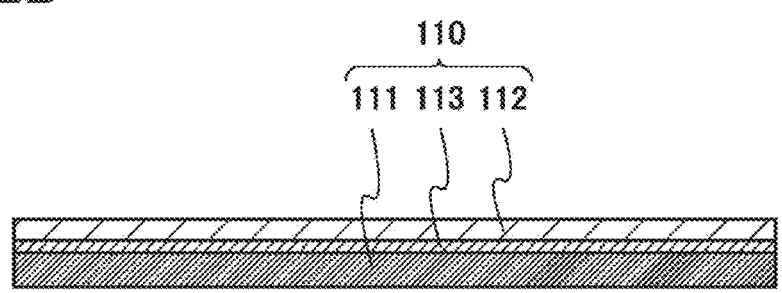

FIG. 2A is a perspective view of an electrode 110 for a storage battery, and FIG. 2B is a longitudinal cross-sectional view of the electrode 110 for the storage battery. Although the electrode 110 for the storage battery in the shape of a rectangular sheet is illustrated in FIG. 2A, the shape of the electrode 110 for the storage battery is not limited thereto and may be selected as appropriate. An active material layer 112 is formed on only one surface of a current collector 111 in FIGS. 2A and 2B; however, active material layers 112 may be formed so that the current collector 111 is sandwiched therebetween. The active material layer 112 does not necessarily need to be formed on the entire surface of the current collector 111 and a region that is not coated, such as a region for connection to an electrode tab, is provided as appropriate. As illustrated in FIGS. 2A and 2B, the electrode 110 for the storage battery preferably includes an undercoat 113 between the active material layer 112 and the current collector 111.

The current collector 111 can be formed using a highly conductive material which is not alloyed with a carrier ion such as a lithium ion, for example, a metal typified by stainless steel, gold, platinum, zinc, iron, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The current collector 111 can have, for example, a foil-like shape, a plate-like shape (sheet-like shape), a net-like shape, a punching-metal shape, or an expanded-metal shape, as appropriate. The current collector 111 preferably has a thickness of greater than or equal to 10 μm and less than or equal to 30 μm.

Figure 2C:
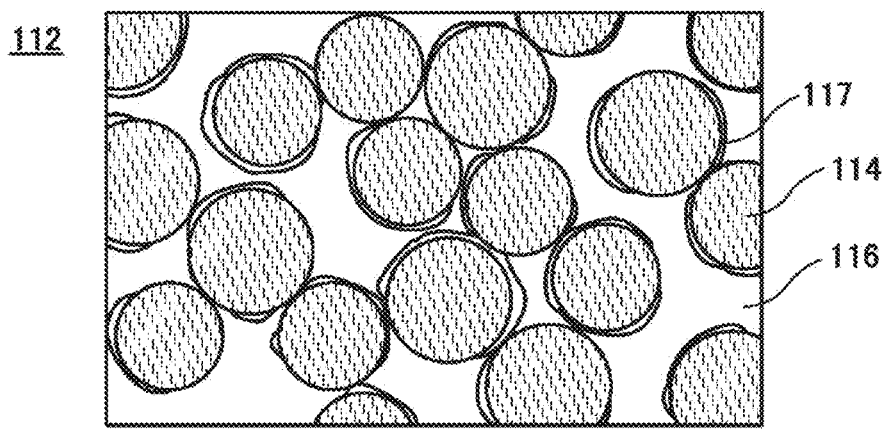

FIG. 2C is a schematic cross-sectional view of part of the active material layer 112. Here, an example of the active material layer 112 including an active material 114 and a binder 116 is shown; however, one embodiment of the present invention is not limited to this example, and the active material layer 112 at least includes the active material 114.

As the active material 114, a material into and from which carrier ions, such as lithium ions or sodium ions, can be inserted and extracted is used.

In the case of using the electrode for the storage battery as a negative electrode of a storage battery, examples of the active material 114 include a lithium metal, a sodium metal, a carbon-based material, and an alloy-based material such as a tin-based alloy.

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium-ion battery can have a high operating voltage. In addition, graphite is preferable because of its advantages such as relatively high capacity per unit volume, small volume expansion, low cost, and safety greater than that of a lithium metal.

Since a sodium ion has an ionic radius larger than that of a lithium ion, insertion and extraction of sodium ions into and from graphite tend to be difficult. For this reason, it is preferable to use non-graphitizing carbon (hard carbon) into and from which ions with a large ionic radius can be inserted and extracted, for example.

For the active material 114, an alloy-based material which enables charge-discharge reactions by an alloying reaction and a dealloying reaction with lithium or sodium can be used. In the case where carrier ions are lithium ions, for example, a material containing at least one of Al, Si, Ge, Sn, Pb, Sb, Bi, Ag, Zn, Cd, In, and Ga can be used. Such elements have higher capacity than carbon. In particular, silicon has a significantly high theoretical capacity of 4200 mAh/g. For this reason, silicon is preferably used as the active material 114. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, as the active material 114, an oxide such as a titanium dioxide ($TiO_2$), a lithium titanium oxide ($Li_4Ti_5O_{12}$), a lithium-graphite intercalation compound ($Li_xC_6$), a niobium pentoxide ($Nb_2O_5$), a tungsten oxide ($WO_2$), or a molybdenum oxide ($MoO_2$) can be used.

Still alternatively, as the active material 114, $Li_{3-x}M_xN$ (M=Co, Ni, or Cu) with a $Li_3N$ structure, which is a nitride including lithium and a transition metal, can be used. For example, $Li_{2.6}Cu_{0.4}N_3$ is preferable because of its high charge and discharge capacity (900 mAh/g and 1890 mAh/cm$^3$).

The nitride including lithium and the transition metal is preferably used, in which case lithium ions are included in the active material 114 and thus the active material 114 can be used in combination with a material for a positive electrode active material which does not contain lithium ions, such as $V_2O_5$ or $Cr_3O_8$. Note that even in the case of using a material including lithium ions as the positive electrode active material, the nitride containing lithium and the transition metal can be used as the negative electrode active material by extracting lithium ions included in the positive electrode active material in advance.

Still further alternatively, a material which causes a conversion reaction can be used as the active material 114. For example, a transition metal oxide with which an alloying reaction with lithium is not caused, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the active material 104 because of its high potential.

Although the active material 114 is illustrated as a particulate substance in FIG. 2C, the shape of the active material 114 is not limited thereto. The active material 114 can have a given shape such as a plate shape, a rod shape, a cylindrical shape, a powder shape, or a flake shape. Further, the active material 114 may have unevenness or fine unevenness on its surface, or may be porous.

In the case of forming the active material layer 112 by a coating method, the active material layer 112 may be formed in such a manner that a conductive additive (not illustrated) and the binder are added to the active material 114 to form a negative electrode paste and the negative electrode paste is applied onto the current collector 111 and dried.

Note that the active material layer 112 may be predoped with lithium. Predoping refers to a method for adsorbing carrier ions in advance on a compound which does not include carrier ions. The predoping may be performed by forming a lithium layer on a surface of the active material layer 112 by a sputtering method. Further, the active material layer 112 can be predoped with lithium by providing lithium foil on the surface thereof.

Further, graphene (not illustrated) is preferably formed on a surface of the active material 114. For example, in the case of using silicon as the active material 114, the volume of silicon is greatly changed due to occlusion and release of carrier ions in charge-discharge cycles. Thus, adhesion between the current collector 111 and the active material layer 112 is decreased, resulting in degradation of battery characteristics caused by charge and discharge. In view of this, graphene is preferably formed on a surface of the active material 114 containing silicon because even when the volume of silicon is changed in charge-discharge cycles, decrease in adhesion between the current collector 111 and the active material layer 112 can be regulated, which makes it possible to reduce degradation of battery characteristics.

Graphene formed on the surface of the active material 114 can be formed by reducing graphene oxide in a similar manner to that of the method for forming the positive electrode. As the graphene oxide, the above-described graphene oxide can be used.

Further, a coating film 117 of, for example, oxide may be formed on the surface of the active material 114. A product formed on the surface of the active material 114 due to decomposition of an electrolytic solution or the like in charging cannot release electric charges used at the time of forming the coating film, and therefore forms irreversible capacity. In contrast, a coating film of, for example, oxide provided on the surface of the active material 114 in advance can reduce or prevent generation of irreversible capacity.

As the coating film 117 coating the active material 114, an oxide film of any one of niobium, titanium, vanadium, tantalum, tungsten, zirconium, molybdenum, hafnium, chromium, aluminum, and silicon or an oxide film containing any one of these elements and lithium can be used. The coating film 117 is denser than a conventional coating film formed on a surface of a negative electrode due to a decomposition product of an electrolytic solution.

Further, the product of the electric resistivity and the thickness of the coating film 117 at 25° C. is greater than or equal to 20 Ω·m·m, preferably greater than or equal to 200 Ω·m·m. When the product of the electric resistivity and the thickness of the coating film 117 at 25° C. is greater than or equal to 20 Ω·m·m, the decomposition reaction between the active material 114 and an electrolytic solution can be reduced. Further, when the product of the electric resistivity and the thickness of the coating film 117 at 25° C. is greater than or equal to 200 Ω·m·m, the decomposition reaction between the active material 114 and an electrolytic solution can be inhibited. When the product of the electric resistivity and the thickness of the coating film 117 at 25° C. is at least greater than or equal to 20 Ω·m·m, electrons can be prevented from being supplied into the interface between the surface of the negative electrode active material and an electrolytic solution in charging and discharging the storage battery, so that the decomposition of the electrolytic solution can be inhibited. Thus, the irreversible decomposition reaction can be inhibited.

For example, niobium oxide ($Nb_2O_5$) has a low electric conductivity of $10^{-9}$ S/cm and a high insulating property. For this reason, a niobium oxide film inhibits an electrochemical decomposition reaction between the negative electrode active material and an electrolytic solution. On the other hand, niobium oxide has a lithium diffusion coefficient of $10^{-9}$ cm$^2$/sec and high lithium ion conductivity. Therefore, niobium oxide can transmit lithium ions.

For example, in the case where graphite is used as a negative electrode active material, a film containing silicon oxide as a main component preferably has a mesh structure where a carbon atom in the graphite is bonded to a silicon atom through an oxygen atom and the silicon atom is bonded to another silicon atom through the oxygen atom.

The coating film 117 covering the active material 114 can be formed by a sol-gel method, for example. The sol-gel method is a method for forming a thin film in such a manner that a solution formed of, for example, metal alkoxide or a metal salt is changed into a gel, which has lost its fluidity, by a hydrolysis reaction and a polycondensation reaction, and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film 117 can be formed on the surface of the active material 114. The use of the coating film 117 can prevent a decrease in the capacity of the storage battery.

Alternatively, the active material 114 may be coated with a coating film after the active material layer 112 is formed over the current collector 111. The coating film can also be formed by the sol-gel method, for example. Slurry for a negative electrode is applied onto the current collector 111 and dried, and then is soaked in a solution formed of, for example, metal alkoxide or a metal salt to cause a hydrolysis reaction and a polycondensation reaction; thus, the coating film can be formed to cover the negative electrode active material, the conductive additive, and the binder. With the use of this method, the coating film does not disturb contacts between particles of the negative electrode active material, which makes it possible to prevent inhibition of electron conduction. Thus, an increase in the resistance of the electrode is inhibited, resulting in an increase in capacity of the battery cell.

This embodiment can be implemented in appropriate combination with any of other embodiments.

Embodiment 2

In this embodiment, a method for forming an electrode for a storage battery of one embodiment of the present invention is described with reference to FIG. 3.

First, description is given of the significance for the use of graphene obtained by reduction of graphene oxide as graphene included in the electrode for the storage battery. Then, a method for forming the electrode for the storage battery using graphene oxide is described.

The electrode for the storage battery of one embodiment of the present invention includes graphene as a conductive additive. However, in the case of forming the electrode for the storage battery by mixing graphene or graphene formed by reducing graphene oxide in advance (RGO is used as an abbreviation of reduced graphene oxide) with an active material and a binder, aggregation of the graphene or RGO occurs in the electrode because of the low dispersion property of the graphene and RGO; therefore, it is difficult to achieve favorable battery characteristics.

On the other hand, the electrode for the storage battery including graphene can also be formed in the following manner: graphene oxide is used as a raw material of a conductive additive of the electrode and mixed with an active material and a binder in a polar solvent (also referred to as dispersion medium) to obtain a mixture (also referred to as slurry), the mixture is applied onto a current collector and dried, and then the graphene oxide is reduced by reduction treatment. When the electrode is formed in such a manner, a network for electron conduction is formed in an active material layer including the active material and the binder. Consequently, the electrode for the storage battery can include a highly conductive active material layer in which particles of active material are electrically connected to each other by graphene.

This is because graphene oxide used as a raw material of graphene is a polar material having a functional group such as an epoxy group, a carbonyl group, a carboxyl group, or a hydroxyl group. Oxygen in the functional group in graphene oxide is negatively charged in a polar solvent; hence, graphene oxide flakes do not easily aggregate but strongly interact with the polar solvent such as N-methyl-2-pyrrolidone (NMP). Thus, the functional group such as an epoxy group in the graphene oxide interacts with the polar solvent, which probably prevents aggregation among graphene oxide flakes, resulting in uniform dispersion of the graphene oxide in the polar solvent.

When graphene oxide is used as a raw material of a conductive additive as described above, the graphene oxide has a high dispersion property in a polar solvent but has low conductivity and thus does not function as the conductive additive without any change. For this reason, in forming the electrode for the storage battery, after at least an active material and graphene oxide are mixed, the graphene oxide needs to be reduced to form highly conductive graphene.

Figure 3:
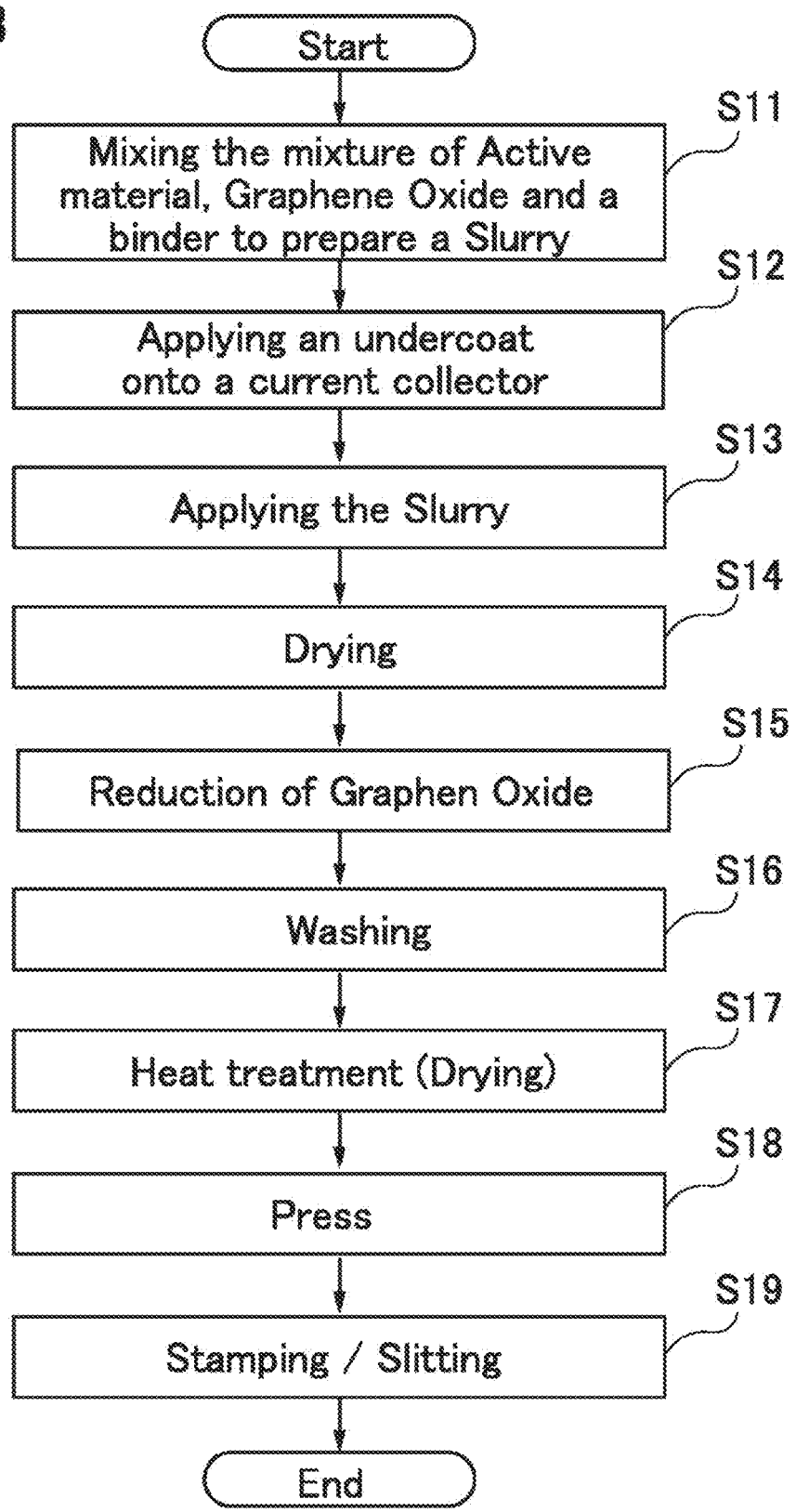
FIG. 3 is a flow chart showing an example of a method for forming an electrode.

FIG. 3 is a flow chart showing the method for forming the electrode for the storage battery of one embodiment of the present invention. First, an active material, graphene oxide, and a binder are prepared. Note that the flow chart in FIG. 3 shows the case of using $Na_2FePO_4F$ and PVDF as the active material and the binder, respectively.

Graphene oxide is a raw material of the graphene flake 105 which serves as a conductive additive later. Graphene oxide can be formed by various synthesis methods such as a Hummers method, a modified Hummers method, and oxidation of graphite. Note that the method for forming the electrode for the storage battery of one embodiment of the present invention is not limited by the degree of separation of graphene oxide layers.

For example, the Hummers method is a method for forming graphite oxide by oxidizing graphite such as flake graphite. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers of the graphite is increased. Therefore, graphene oxide can be easily obtained by separation of the layers from each other by, for example, ultrasonic treatment.

The length of one side (also referred to as a flake size) of the graphene oxide is greater than or equal to 50 nm and less than or equal to 100 μm, preferably greater than or equal to 800 nm and less than or equal to 20 μm. Particularly in the case where the flake size is smaller than the average diameter of a particle of the active material 104, surface contact with a plurality of particles of the active material 104 and connection between graphene flakes are difficult, resulting in difficulty in increasing the electric conductivity of the active material layer 102.

First, as shown in FIG. 3, the graphene oxide, the active material, and the binder are added to a polar solvent such as N-methyl-2-pyrrolidone (NMP) or dimethylformamide, and they are mixed to prepare a paste mixture (also referred to as slurry) (Step S11). When a material which significantly interacts with graphene oxide is used for the active material 104, graphene oxide flakes can be more evenly dispersed in the active material 104.

Here, preparation of the slurry is described in detail. The graphene oxide is preferably dispersed in the polar solvent such as NMP. When the graphene oxide accounts for less than or equal to 0.1 wt % of the total weight of the active material, the graphene oxide, and the binder, the electric conductivity of the electrode including the active material layer 102 is decreased.

When the graphene oxide accounts for more than 10 wt % of the total weight, the electric conductivity of the electrode is increased while the viscosity of the slurry is increased depending on the particle diameter of the active material. Further, at the time of the drying step after the slurry is applied to the current collector 101, convection is generated in a positive electrode paste due to heating. Graphene oxide flakes which are light and thin move and aggregate together due to the convection; consequently, when the active material layer 102 is dried, cracks might be generated in the active material layer 102 or the active material layer 102 might be separated from the current collector 101. In other words, strength of the electrode tends to decline. Therefore, the graphene oxide preferably accounts for more than or equal to 0.2 wt % and less than or equal to 10 wt %, more preferably more than or equal to 0.3 wt % and less than or equal to 0.8 wt % of the total weight of the active material, the graphene oxide, and the binder.

First, the polar solvent is added to the mixture of the active material and graphene oxide, and the paste mixture of the active material, the graphene oxide, and the polar solvent is kneaded (the paste is mixed in the high viscosity), whereby the aggregation of the graphene oxide and the active material can be reduced. Since graphene oxide has a functional group, oxygen in the functional group is negatively charged in a polar solvent; thus, graphene oxide flakes do not easily aggregate. Due to interaction with the active material, the graphene oxide can be dispersed more uniformly.

Next, the binder is added to the mixture. By adding the binder while the graphene oxide is uniformly dispersed to be in contact with a plurality of particles of the active material, the active material and the graphene oxide can be bound to each other while maintaining the dispersed state. Depending on the compounding ratio between the active material and the graphene oxide, the binder does not need to be added; however, addition of the binder increases the strength of the electrode.

Then, a polar solvent is added to the mixture until the mixture has predetermined viscosity and the polar solvent and the mixture are mixed; thus, the slurry can be prepared. In this step, the mixing and the addition of the polar solvent may be repeated two or more times.

Through the above steps, the slurry is formed so that the active material, the graphene oxide, and the binder are uniformly dispersed in the slurry.

In the case of forming a positive electrode as the electrode for the storage battery, the compounding ratio of the active material to the graphene oxide and the binder at the time of preparing the slurry is preferably 91:4:5 to 94.8:0.2:5, for example. In this embodiment, the compounding ratio of the active material to the graphene oxide and the binder is 94.4:0.6:5.

Next, an undercoat is applied onto the current collector (Step S12). Application of the undercoat onto the current collector increases the adhesion between the current collector and the active material layer formed later. Examples of the undercoat include a mixture of graphite and sodium polyacrylate (PAA) and a mixture of AB and PVDF. The compounding ratio of graphite to PAA is preferably 95:5 to 50:50, and the compounding ratio of AB to PVDF is preferably 70:30 to 50:50. In this embodiment, the compounding ratio of graphite to PAA is 90:10.

Note that if there is no problem with the adhesion between the current collector and the active material layer, the electrode strength, and the contact resistance, it is not necessary to apply the undercoat onto the current collector.

Next, the slurry prepared in Step S11 is provided on one of or both surfaces of the current collector by a coating method such as a doctor blade method (Step S13).

The slurry provided over the current collector is dried by a method such as ventilation drying or reduced pressure (vacuum) drying to form the active material layer (Step S14). The drying is preferably performed using a hot wind with a temperature higher than or equal to 50° C. and lower than or equal to 180° C. Through this step, the polar solvent contained in the active material layer 102 is evaporated. There is no particular limitation on the atmosphere.

Here, the active material layer may be pressed by a compression method such as a roll press method or a flat press method to be consolidated. Further, by applying heat at higher than or equal to 90° C. and lower than or equal to 180° C., preferably lower than or equal to 120° C. when the pressing is performed, the binder (e.g., PVDF) contained in the undercoat or the active material layer is softened to the extent that the characteristics of the electrode is not changed; thus, the adhesion between the current collector and the active material layer is further increased.

Next, reduction treatment of the graphene oxide is performed (Step S15). Examples of the reduction treatment of graphene oxide include reduction treatment with heating (hereinafter referred to as thermal reduction treatment), electrochemical reduction treatment performed by application of a potential at which graphene oxide is reduced in an electrolytic solution (hereinafter referred to as electrochemical reduction), and reduction treatment using a chemical reaction caused with a reducer (hereinafter referred to as chemical reduction).

When graphene oxide is thermally reduced to increase electric conductivity, it is preferable to perform heat treatment at 1000° C. or higher in an inert atmosphere such as an argon atmosphere. However, as described above, to maintain the dispersion property of the graphene oxide, reduction treatment is preferably performed after the graphene oxide is mixed with the active material and the binder and the resulting slurry is applied onto the current collector. On the other hand, after the graphene oxide is mixed with the active material and the binder, it is not possible to perform heat treatment at a temperature higher than or equal to the heat-resistant temperature of the binder such as PVDF and higher than or equal to the heat-resistant temperature of the material of the current collector. For this reason, when the heat treatment is performed at temperature lower than the heat-resistant temperature of the material of the current collector or the binder, the heat treatment is preferably performed for several hours to several tens of hours.

In the case of performing electrochemical reduction treatment, it is necessary to sufficiently apply voltage evenly to the electrode for the storage battery in the condition where an electrolytic solution does not dissolve materials of the electrode. Further, in the case of the electrochemical reduction, it is preferable that a certain distance be kept between a counter electrode and the current collector provided with the active material layer containing graphene oxide, and treatment be performed in an electrolytic solution.

In the method for forming the electrode for the storage battery of one embodiment of the present invention, chemical reduction is employed to reduce graphene oxide. The chemical reduction is performed using a reducing solution.

In Step S15, the graphene oxide is reacted with the use of a reducing solution. Through this step, the graphene oxide contained in the active material layer is reduced to form graphene. The treatment is also referred to as chemical reduction of the graphene oxide. Note that oxygen in the graphene oxide is not necessarily entirely extracted and may partly remain in the graphene. When the graphene contains oxygen, the ratio of oxygen measured by XPS in the graphene is more than or equal to 2 atomic % and less than or equal to 20 atomic %, preferably more than or equal to 3 atomic % and less than or equal to 15 atomic %. This reduction treatment is preferably performed at a room temperature or higher and 150° C. or lower, preferably a room temperature or higher and 80° C. or lower. In addition, the reduction time of the graphene oxide can be 3 minutes or longer and 10 hours or shorter.

Examples of a reducer contained in the reducing solution are ascorbic acid, hydrazine, dimethyl hydrazine, hydroquinone, sodium boron hydride ($NaBH_4$), tetra butyl ammonium bromide (TBAB), $LiAlH_4$, N,N-diethylhydroxylamine, and a derivative thereof.

A polar solvent can be used as the solvent contained in the reducing solution. Any material can be used for the polar solvent as long as it can dissolve the reducer. Examples of the material of the polar solvent are water, methanol, ethanol, acetone, tetrahydrofuran (THF), dimethylformamide (DMF), N-methyl-2-pyrrolidone (NMP), dimethyl sulfoxide (DMSO), ethylene glycol, diethylene glycol, glycerin, and a mixed solution of any two or more of the above.

Further, a reducing solution with a pH less than 4 might cause dissolution of an active material. A reducing solution with a pH greater than or equal to 11 might cause gelation of PVDF which is used as a binder. For these reasons, the pH of the reducing solution is greater than or equal to 4 and less than 11, preferably greater than or equal to and less than or equal to 7. Any kind of alkaline solution or alkaline salt can be used as a pH adjuster; for example, sodium hydroxide, potassium hydroxide, calcium hydroxide, lithium hydroxide, ammonium hydroxide, sodium carbonate, potassium carbonate, calcium carbonate, or lithium carbonate can be used.

As the reducing solution, a mixed solution of ethanol and ascorbic acid or a mixed solution of water, ascorbic acid, and lithium hydroxide can be used. In this embodiment, description is given of the case of using a reducing solution containing ascorbic acid, water, and lithium hydroxide.

Graphene is probably formed in such a manner that protons are added to graphene oxide by ascorbic acid by soaking an active material layer formed over a current collector in a reducing solution, and then the graphene oxide is reduced by the release of $H_2O$, for example.

Then, washing (Step S16) and drying (Step S17) are performed. The drying is preferably performed in a reduced pressure (vacuum) atmosphere or a reduction atmosphere. This drying step is performed at, for example, higher than or equal to 50° C. and lower than or equal to 200° C. in vacuum for longer than or equal to 1 hour and shorter than or equal to 48 hours. The drying allows evaporation, volatilization, or removal of the polar solvent and moisture in the active material layer.

Next, the electrode is pressed (Step S18). Thus, the adhesion between the current collector and the active material layer can be increased. In addition, the active material layer can be consolidated. Further, by applying heat at higher than or equal to 90° C. and lower than or equal to 180° C., preferably lower than or equal to 120° C. when the pressing is performed, the binder (e.g., PVDF) contained in the undercoat or the active material layer is softened to the extent that the characteristics of the electrode is not changed; thus, the adhesion between the current collector and the active material layer can be further increased.

Finally, stamping is carried out so that the current collector and the active material layer have a predetermined size (Step S19), whereby the electrode for the storage battery is fabricated.

Note that heating can facilitate the reduction reaction. After the drying following the chemical reduction, heating may further be performed.

In the above-described formation process of the electrode for the storage battery, the active material layer is pressed in Step S18; however, the active material layer may be pressed after the cleaning step (Step S16) or the drying step (Step S17). That is, the step of pressing is performed at least after any of the drying step (Steps S14), the cleaning step (Step S16), and the drying step (Step S17), or is omitted. Note that to promote the reduction of the graphene oxide contained in the active material layer, the active material layer is preferably immersed in the reducing solution uniformly. For this reason, the active material layer preferably has low density at the time of the reduction step, and the step of pressing the active material layer is preferably performed after the reduction step.

Through the above steps, the electrode 100 for the storage battery including the active material layer 102 in which the graphene flake 105 is uniformly dispersed in the active material 104 can be formed.

When the graphene oxide is reduced by heat treatment, a functional group included in the graphene oxide might be released as $CO_2$, in which case a defect is formed in graphene due to the released C.

As described in this embodiment, only a functional group included in the graphene oxide can be released by reducing the graphene oxide by chemical reduction, which makes it possible to prevent formation of a defect in graphene.

As described in this embodiment, when the graphene oxide is reduced by chemical reduction, the temperature of the reduction of the graphene oxide can be higher than or equal to a room temperature and lower than or equal to 150° C., preferably higher than or equal to a room temperature and lower than or equal to 80° C. Further, the reduction time of the graphene oxide can be longer than or equal to 3 minutes and shorter than or equal to 10 hours. Thus, the graphene oxide can be reduced at low temperature in short time. In addition, length of time needed to control the temperature of a heat treatment apparatus can be shortened because the reduction temperature of the graphene oxide can be low.

In chemical reduction, the active material layer is uniformly immersed in the reducing solution; therefore, the graphene oxide can be sufficiently reduced at lower temperature in shorter time than in thermal reduction. Accordingly, the compounding ratio of graphene serves as a conductive additive can be reduced as much as possible. Thus, the strength of the electrode for the storage battery can be increased, which makes it possible to increase discharging capacity of a battery cell using the electrode for the storage battery and increase the energy density thereof.

Further, adding and mixing the active material into the graphene oxide dispersed in the polar solvent allow the graphene oxide to be dispersed more uniformly. Furthermore, the active material layer in which graphene is uniformly dispersed can be formed in such a manner that the binder is added, the slurry in which graphene oxide is uniformly dispersed is applied to the current collector, and then the graphene oxide is reduced.

The graphene is in contact with part of a surface of the active material. The plurality of graphene flakes are formed in such a way as to wrap or coat a plurality of particles of the active material, or be adhered to surfaces of the plurality of particles of the active material, so that the graphene flakes make surface contact with the particles of the active material. Further, the graphene flakes are also in surface contact with each other; consequently, the plurality of graphene flakes form a three-dimensional network for electronic conduction. This makes it possible to increase the electric conductivity between the particles of the active material or between particles of the active material and the current collector. The use of such an electrode improves the cycle performance and discharging rate of the storage battery.

In an electrode for a storage battery including an active material with low electric conductivity, such as an active material with a band gap of 3.0 eV or more, preferably 3.5 eV or more, more preferably 4.0 eV or more, graphene is preferably used as a conductive additive because the electric conductivity between particles of the active material or between particles of the active material and a current collector can be enhanced.

Further, a polyanionic compound is preferably used as the active material because it is possible to form an electrode with high cell potential and high electric conductivity.

With the use of graphene as a conductive additive, it is possible to form an electrode for a storage battery including an active material layer which is highly filled with active material particles and includes the active material particles at high density with a small amount of a conductive additive. The use of the electrode for a storage battery enables fabrication of the storage battery having high capacity per unit volume of the electrode.

This embodiment can be implemented in appropriate combination with any of the other embodiments.

Embodiment 3

In this embodiment, examples of a battery cell of one embodiment of the present invention and a formation method thereof are described with reference to FIGS. 4A to 4C.

Figure 4A:
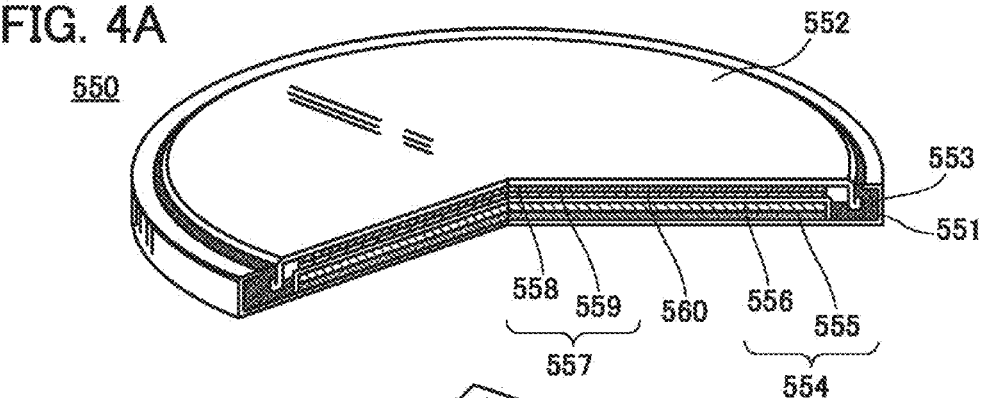
FIGS. 4A to 4C each illustrate a battery cell.

FIG. 4A is an external view of a coin-type (single-layer flat type) battery cell, part of which illustrates a cross-sectional view of the coin-type battery cell.

In a coin-type battery cell 550, a positive electrode can 551 serving also as a positive electrode terminal and a negative electrode can 552 serving also as a negative electrode terminal are insulated and sealed with a gasket 553 formed of polypropylene or the like. A positive electrode 554 includes a positive electrode current collector 555 and a positive electrode active material layer 556 which is provided to be in contact with the positive electrode current collector 555. A negative electrode 557 includes a negative electrode current collector 558 and a negative electrode active material layer 559 which is provided to be in contact with the negative electrode current collector 558. A separator 560 and an electrolytic solution (not illustrated) are included between the positive electrode active material layer 556 and the negative electrode active material layer 559.

The negative electrode 557 includes the negative electrode current collector 558 and the negative electrode active material layer 559. The positive electrode 554 includes the positive electrode current collector 555 and the positive electrode active material layer 556.

As the positive electrode 554 and the negative electrode 557, any of the electrodes for the storage batteries described with reference to FIGS. 1A to 1C, FIGS. 2A to 2C, and FIG. 3 can be used.

As the separator 560, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

The electrolytic solution consists of an electrolyte and an electrolyte solvent.

As a solvent for the electrolytic solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is added as the solvent for the electrolytic solution, safety against liquid leakage and the like is improved. Further, a battery cell can be thinner and more lightweight. Typical examples of the gelled high-molecular material include a silicone gel, an acrylic gel, an acrylonitrile gel, polyethylene oxide, polypropylene oxide, and a fluorine-based polymer.

Further, as the solvent for the electrolytic solution, an ionic liquid composed of an organic cation and an organic anion (also referred to as a room temperature molten salt) can be used. Examples of the organic cation include aliphatic onium cations, such as a quaternary ammonium cation, a tertiary sulfonium cation, and a quaternary sulfonium cation, and aromatic cations, such as an imidazolium cation and a pyridinium cation. Examples of the organic anion include $(C_nF_{2n+1}SO_2)_2N^-$ (n=0 to 4), $(C_mF_{2m+1}SO_3)^-$ (m=0 to 4), and $CF_2(CF_2SO_2)_2N^-$.

Since the ionic liquid is less likely to burn and volatilize, it is possible to prevent the battery cell from exploding or catching fire even when the internal temperature increases due to an internal short circuit or overcharging, for example. Thus, the safety of the battery cell can be increased. With the use of the ionic liquid as the solvent for the electrolytic solution, operation of the battery cell in a low temperature range (subfreezing temperature range) can be better as compared with the case of using an organic solvent as the solvent for the electrolytic solution.

Further, as the solvent for the electrolytic solution, an organic solvent may be used; one organic solvent or a mixed solvent of a plurality of organic solvents may be used. In a similar way, as the ionic liquid, an organic solvent may be used; one organic solvent or a mixed solvent of a plurality of organic solvents may be used. Furthermore, a mixed solvent of an ionic liquid and an organic solvent may be used.

As an electrolyte dissolved in the solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

Although the case of the electrolyte in which carrier ions are lithium ions is described, carrier ions other than lithium ions can be used. In the case of the carrier ions other than lithium ions, such as alkali metal ions other than lithium ions or alkaline-earth metal ions, any of the lithium salts including an alkali metal (e.g., sodium or potassium) or an alkaline-earth metal (e.g., calcium, strontium, barium, beryllium, or magnesium) instead of lithium may be used as the electrolyte. As an electrolyte including sodium, $NaPF_6$, $NaClO_4$, or $NaN(CF_3SO_2)_2$ can be used, for example.

For the positive electrode can 551 and the negative electrode can 552, a metal having corrosion resistance to an electrolytic solution, such as nickel, aluminum, or titanium, an alloy of such a metal, or an alloy of such a metal and another metal (e.g., stainless steel) can be used. Alternatively, the positive electrode can 551 and the negative electrode can 552 are preferably coated with, for example, nickel or aluminum in order to prevent corrosion caused by the electrolytic solution. The positive electrode can 551 and the negative electrode can 552 are electrically connected to the positive electrode 554 and the negative electrode 557, respectively.

The negative electrode 557, the positive electrode 554, and the separator 560 are immersed in the electrolytic solution. Then, as illustrated in FIG. 4A, the positive electrode can 551, the positive electrode 554, the separator 560, the negative electrode 557, and the negative electrode can 552 are stacked in this order with the positive electrode can 551 positioned at the bottom, and the positive electrode can 551 and the negative electrode can 552 are subjected to pressure bonding with the gasket 553 interposed therebetween. In such a manner, the coin-type battery cell 550 is fabricated.

Next, an example of a laminated battery cell is described with reference to FIG. 4B. In FIG. 4B, a structure inside the laminated battery cell is partly exposed for convenience.

Figure 4B:
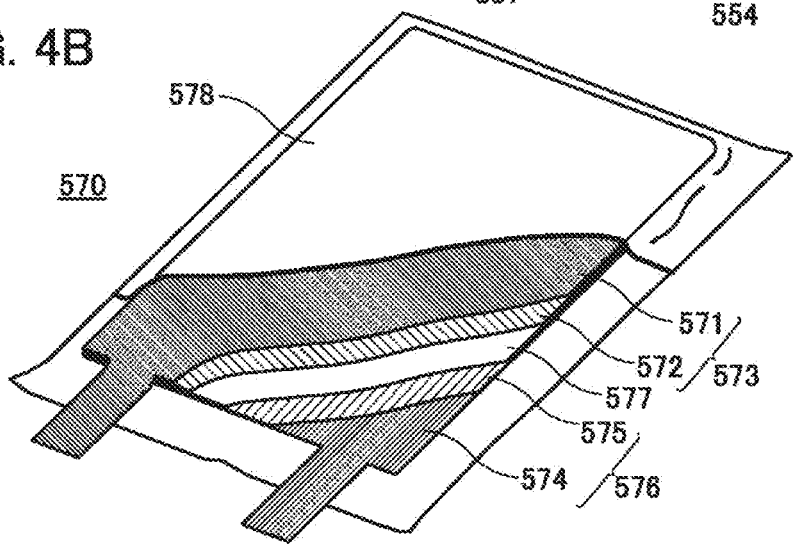
Figure 4C:
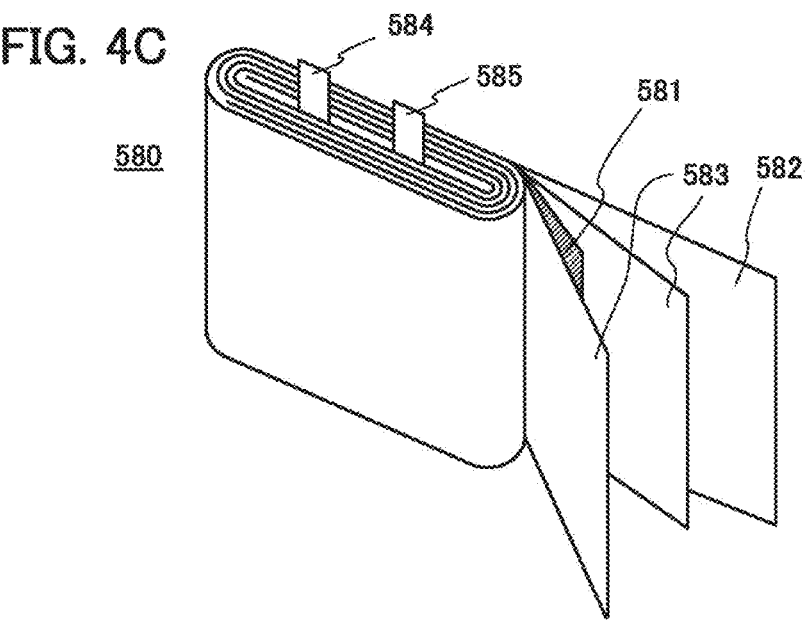

A laminated battery cell 570 illustrated in FIG. 4B includes a positive electrode 573 including a positive electrode current collector 571 and a positive electrode active material layer 572, a negative electrode 576 including a negative electrode current collector 574 and a negative electrode active material layer 575, a separator 577, an electrolytic solution (not illustrated), and an exterior body 578. The separator 577 is provided between the positive electrode 573 and the negative electrode 576 in the exterior body 578. The exterior body 578 is filled with the electrolytic solution. Although the one positive electrode 573, the one negative electrode 576, and the one separator 577 are used in FIG. 4B, the battery cell may have a stacked-layer structure in which positive electrodes and negative electrodes are alternately stacked and separated by separators.

As the positive electrode 573 and the negative electrode 576, any of the electrodes for the storage batteries described with reference to FIGS. 1A to 1C, FIGS. 2A to 2C, and FIG. 3 can be used.

For the separator 577, a material similar to that of the separator 560 illustrated in FIG. 4A can be used. For the electrolytic solution, materials similar to those of the electrolytic solution given in the description of the battery cell in FIG. 4A can be used.

In the laminated battery cell 570 illustrated in FIG. 4B, the positive electrode current collector 571 and the negative electrode current collector 574 also serve as terminals (tabs) for an electrical contact with the outside. For this reason, each of the positive electrode current collector 571 and the negative electrode current collector 574 is arranged so that part of the positive electrode current collector 571 and part of the negative electrode current collector 574 are exposed outside the exterior body 578.

As the exterior body 578 in the laminated battery cell 570, a laminate film having a three-layer structure can be used, for example. In the three-layer structure, a highly flexible metal thin film of, for example, aluminum, stainless steel, copper, or nickel is provided over a film formed of a material such as polyethylene, polypropylene, polycarbonate, ionomer, or polyamide, and an insulating synthetic resin film of, for example, a polyamide-based resin or a polyester-based resin is provided as the outer surface of the exterior body over the metal thin film. With such a three-layer structure, permeation of an electrolytic solution and a gas can be blocked and an insulating property and resistance to the electrolytic solution can be provided.

Next, an example of a rectangular battery cell is described with reference to FIG. 4C. A wound body 580 illustrated in FIG. 4C includes a negative electrode 581, a positive electrode 582, and a separator 583. The wound body 580 is obtained by winding a sheet of a stack in which the negative electrode 581 overlaps with the positive electrode 582 with the separator 583 provided therebetween. The wound body 580 is covered with a rectangular sealed can (not illustrated); thus, a rectangular battery cell is fabricated. The rectangular sealed can is filled with an electrolytic solution (not illustrated). Note that the number of stacks each including the negative electrode 581, the positive electrode 582, and the separator 583 may be determined as appropriate depending on capacity and an element volume which are required.

Further, the negative electrode 581 is connected to a negative electrode tab (not illustrated) through one of a terminal 584 and a terminal 585, and the positive electrode 582 is connected to a positive electrode tab (not illustrated) through the other of the terminal 584 and the terminal 585.

As described above, although the coin-type battery cell, the laminated battery cell, and the rectangular battery cell are described as the examples of the battery cell, battery cells having a variety of shapes can be used. Further, it is also possible to employ a structure in which a plurality of positive electrodes, a plurality of negative electrodes, and a plurality of separators are stacked or wound.

As the positive electrode 582 and the negative electrode 581, any of the electrodes for the storage batteries described with reference to FIGS. 1A to 1C, FIGS. 2A to 2C, and FIG. 3 can be used.

In addition, a power storage device can be fabricated using two or more of the battery cells of one embodiment of the present invention.

In an electrode for a storage battery including an active material with low electric conductivity, such as an active material with a band gap of 3.0 eV or more, preferably 3.5 eV or more, more preferably 4.0 eV or more, the use of graphene as a conductive additive can enhance the electric conductivity between particles of the active material or between particles of the active material and a current collector. The use of such an electrode improves the cycle performance and discharging rate of a storage battery.

The polyanionic compound used as a positive electrode active material has a high cell potential but tends to have low electric conductivity. For this reason, when the polyanionic compound is used as a positive electrode active material, the use of graphene as a conductive additive makes it possible to enhance the electric conductivity between particles of the active material or between particles of the active material and a current collector. The use of such an electrode improves the cycle performance and discharging rate of a storage battery.

Note that in this embodiment, the description is given of the case where the use of graphene as a conductive additive is effective when an active material with low electric conductivity, such as an active material with a band gap of 3.0 eV or more, preferably 3.5 eV or more, more preferably 4.0 eV or more is used; however, one embodiment of the present invention is not limited to this case. Even when an active material with a band gap less than 3.0 eV is used, the electric conductivity between the active material and the current collector can be further enhanced. The use of such an electrode improves the cycle performance and discharging rate of a storage battery.

With the use of graphene as a conductive additive, it is possible to form an electrode for a storage battery including an active material layer which is highly filled with an active material and includes the active material at high density with a small amount of a conductive additive. The use of the electrode for the storage battery enables fabrication of a storage battery having high capacity per unit volume of the electrode.

This embodiment can be freely combined with any of the other embodiments.

Embodiment 4

The battery cell of one embodiment of the present invention and a power storage device including a plurality of battery cells can be used for power sources of a variety of electrical devices which are operated with electric power.

Specific examples of electrical devices each using the power storage device of one embodiment of the present invention are as follows: display devices such as televisions and monitors, lighting devices, desktop personal computers and laptop personal computers, word processors, image reproduction devices which reproduce still images and moving images stored in recording media such as digital versatile discs (DVDs), portable CD players, radio receivers, tape recorders, headphone stereos, stereos, table clocks, wall clocks, cordless phone handsets, transceivers, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by electric motors using electric power from a power storage device are also included in the category of electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electrical devices, the power storage device of one embodiment of the present invention can be used as a main power source for supplying enough electric power for almost the whole power consumption. Alternatively, in the electrical devices, the power storage device of one embodiment of the present invention can be used as an uninterruptible power source which can supply power to the electrical devices when the supply of electric power from the main power source or a commercial power source is stopped. Still alternatively, in the electrical devices, the power storage device of one embodiment of the present invention can be used as an auxiliary power source for supplying electric power to the electrical devices at the same time as the power supply from the main power source or a commercial power source.

Figure 5:
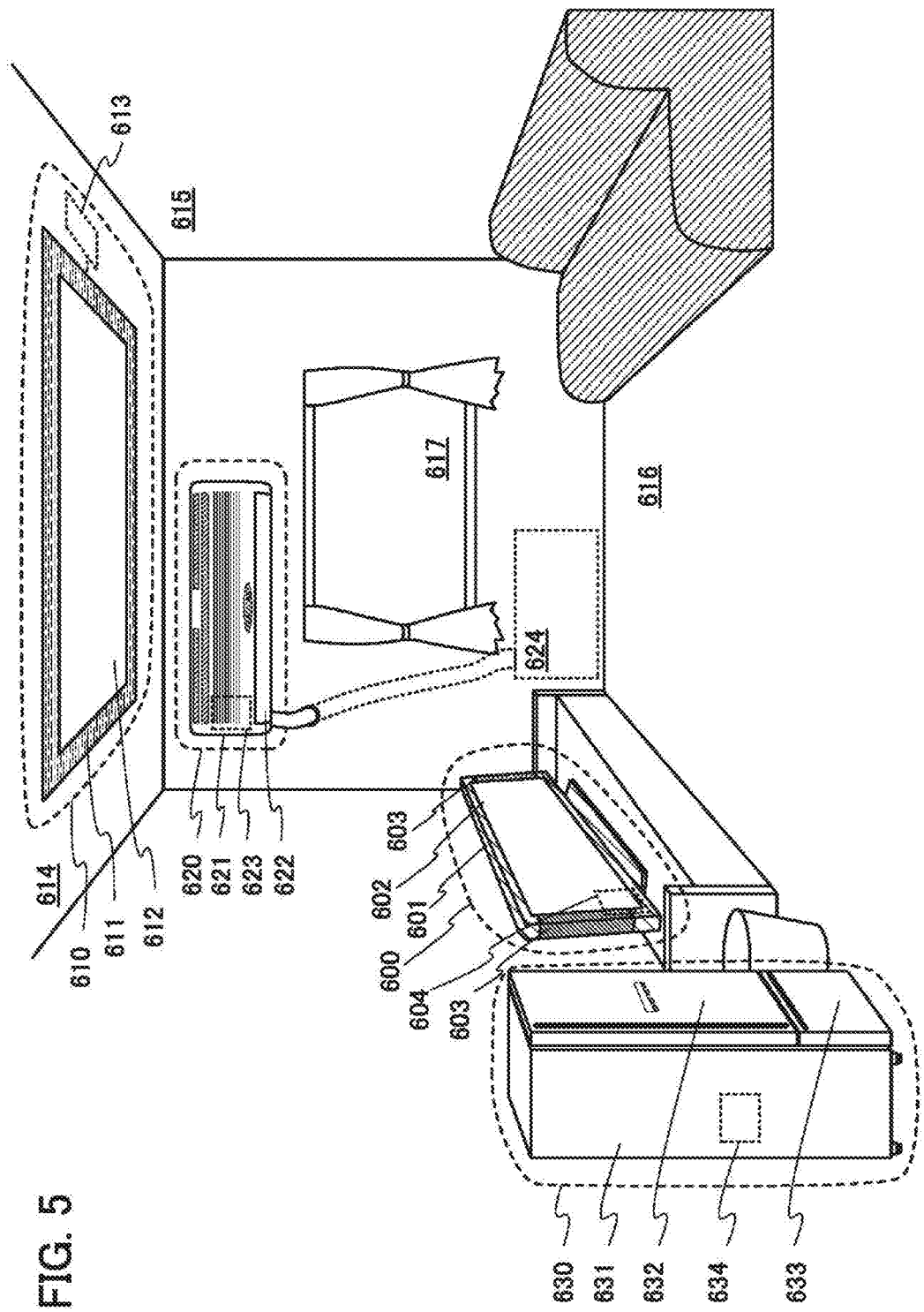
FIG. 5 illustrates electrical devices.

FIG. 5 illustrates specific structures of the electrical devices. In FIG. 5, a display device 600 is an example of an electrical device using a power storage device 604, which is one embodiment of the present invention. Specifically, the display device 600 corresponds to a display device for TV broadcast reception and includes a housing 601, a display portion 602, speaker portions 603, and the power storage device 604. The power storage device 604, which is one embodiment of the present invention, is provided in the housing 601. The display device 600 can receive electric power from a commercial power source. Alternatively, the display device 600 can use electric power stored in the power storage device 604. Thus, the display device 600 can be operated with the use of the power storage device 604, which is one embodiment of the present invention, as an uninterruptible power source even when electric power cannot be supplied from a commercial power source due to power failure, for example.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 602.

Note that the display device includes, in its category, all of information display devices for personal computers, advertisement displays, and the like besides TV broadcast reception.

In FIG. 5, an installation lighting device 610 is an example of an electrical device using a power storage device 613, which is one embodiment of the present invention. Specifically, the lighting device 610 includes a housing 611, a light source 612, and the power storage device 613. Although FIG. 5 illustrates the case where the power storage device 613 is provided in a ceiling 614 on which the housing 611 and the light source 612 are installed, the power storage device 613 may be provided in the housing 611. The installation lighting device 610 can receive electric power from a commercial power source. Alternatively, the installation lighting device 610 can use electric power stored in the power storage device 613. Thus, the installation lighting device 610 can be operated with the use of the power storage device 613, which is one embodiment of the present invention, as an uninterruptible power source even when electric power cannot be supplied from a commercial power source due to power failure or the like.

Note that although the installation lighting device 610 provided in the ceiling 614 is illustrated in FIG. 5 as an example, the power storage device of one embodiment of the present invention can be used as an installation lighting device provided in, for example, a wall 615, a floor 616, or a window 617 other than the ceiling 614. Alternatively, the power storage device can be used in a tabletop lighting device, for example.

As the light source 612, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 5, an air conditioner including an indoor unit 620 and an outdoor unit 624 is an example of an electrical device including a power storage device 623, which is one embodiment of the invention. Specifically, the indoor unit 620 includes a housing 621, an air outlet 622, and the power storage device 623. Although FIG. 5 illustrates the case where the power storage device 623 is provided in the indoor unit 620, the power storage device 623 may be provided in the outdoor unit 624. Alternatively, the power storage devices 623 may be provided in both the indoor unit 620 and the outdoor unit 624. The air conditioner can receive electric power from a commercial power source. Alternatively, the air conditioner can use electric power stored in the power storage device 623. Particularly in the case where the power storage devices 623 are provided in both the indoor unit 620 and the outdoor unit 624, the air conditioner can be operated with the use of the power storage device 623, which is one embodiment of the present invention, as an uninterruptible power source even when electric power cannot be supplied from a commercial power source due to power failure or the like.

Note that although the split-type air conditioner including the indoor unit and the outdoor unit is illustrated in FIG. 5 as an example, the power storage device of one embodiment of the present invention can be used in an air conditioner in which the functions of an indoor unit and an outdoor unit are integrated in one housing.

In FIG. 5, an electric refrigerator-freezer 630 is an example of an electrical device using a power storage device 634, which is one embodiment of the present invention. Specifically, the electric refrigerator-freezer 630 includes a housing 631, a door 632 for a refrigerator, a door 633 for a freezer, and the power storage device 634. The power storage device 634 is provided inside the housing 631 in FIG. 5. The electric refrigerator-freezer 630 can receive electric power from a commercial power source. Alternatively, the electric refrigerator-freezer 630 can use electric power stored in the power storage device 634. Thus, the electric refrigerator-freezer 630 can be operated with the use of the power storage device 634, which is one embodiment of the present invention, as an uninterruptible power source even when electric power cannot be supplied from a commercial power source due to power failure or the like.

Note that among the electrical devices described above, the high-frequency heating apparatus such as microwave ovens and the electrical device such as electric rice cookers require high electric power in a short time. The tripping of a breaker of a commercial power source in use of the electrical device can be prevented by using the power storage device of one embodiment of the present invention as an auxiliary power source for supplying electric power which cannot be supplied enough by a commercial power source.

In addition, in a time period when the electrical devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electrical devices are used. For example, in the case of the electric refrigerator-freezer 630, electric power can be stored in the power storage device 634 in night time when the temperature is low and the door 632 for the refrigerator and the door 633 for the freezer are not often opened or closed. On the other hand, in daytime when the temperature is high and the door 632 for the refrigerator and the door 633 for the freezer are frequently opened and closed, the power storage device 634 is used as an auxiliary power source; thus, the usage rate of electric power in daytime can be reduced.

This embodiment can be implemented combining with any of the other embodiments as appropriate.

Embodiment 5

Next, a portable information terminal which is an example of the electrical devices is described with reference to FIGS. 6A to 6C.

Figure 6A:
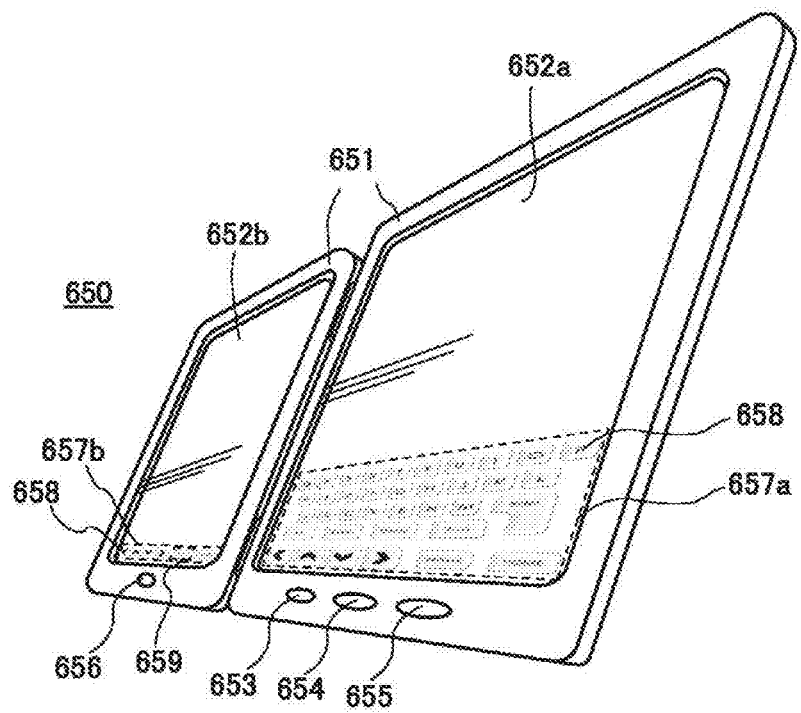
FIGS. 6A to 6C illustrate an electronic device.
Figure 6B:
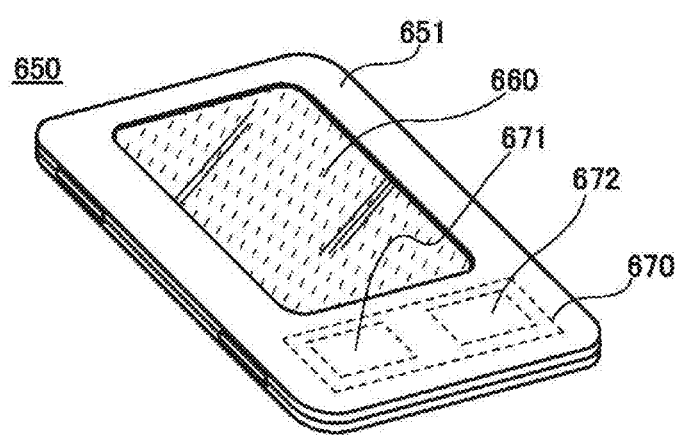

FIGS. 6A and 6B illustrate a tablet terminal 650 that can be folded. In FIG. 6A, the tablet terminal 650 is open (unfolded) and includes a housing 651, a display portion 652a, a display portion 652b, a switch 653 for switching display modes, a power switch 654, a switch 655 for switching to power-saving-mode, and an operation switch 656.

Part of the display portion 652a can be a touch panel region 657a and data can be input when a displayed operation key 658 is touched. Note that FIG. 6A illustrates, as an example, that half of the area of the display portion 652a has only a display function and the other half of the area has a touch panel function. However, the structure of the display portion 652a is not limited to this, and all the area of the display portion 652a may have a touch panel function. For example, all the area of the display portion 652a can display keyboard buttons and serve as a touch panel while the display portion 652b can be used as a display screen.

Like the display portion 652a, part of the display portion 652b can be a touch panel region 657b. When a finger, a stylus, or the like touches the place where a button 659 for switching to keyboard display is displayed in the touch panel, keyboard buttons can be displayed on the display portion 652b.

Touch input can be performed on the touch panel regions 657a and 657b at the same time.

The switch 653 for switching display modes can switch the display between portrait mode and landscape mode, and between monochrome display and color display, for example. With the switch 655 for switching to power-saving mode, the luminance of display can be optimized depending on the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display area of the display portion 652a is the same as that of the display portion 652b in FIG. 6A, one embodiment of the present invention is not particularly limited thereto. The display area of the display portion 652a may be different from that of the display portion 652b, and further, the display quality of the display portion 652a may be different from that of the display portion 652b. For example, one of the display portions 652a and 652b may display higher definition images than the other.

In FIG. 6B, the tablet terminal 650 is close (folded) and includes the housing 651, a solar cell 660, a charge and discharge control circuit 670, a battery 671, and a DC-DC converter 672. FIG. 6B illustrates an example where the charge and discharge control circuit 670 includes the battery 671 and the DC-DC converter 672. The battery 671 includes the power storage device described in any of the above embodiments.

Since the tablet terminal 650 can be folded, the housing 651 can be closed when the tablet terminal 650 is not in use. Thus, the display portions 652a and 652b can be protected, thereby providing the tablet terminal 650 with excellent endurance and excellent reliability for long-term use.

The tablet terminal illustrated in FIGS. 6A and 6B can also have a function of displaying various kinds of data (e.g., a still image, a moving image, and a text image), a function of displaying a calendar, the date, the time, or the like on the display portion, a touch-input function of operating or editing data displayed on the display portion by touch input, a function of controlling processing by various kinds of software (programs), and the like.

The solar cell 660, which is attached on the surface of the tablet terminal, supplies electric power to the touch panel, the display portion, a video signal processor, and the like. Note that the solar cell 660 can be provided on one or both surfaces of the housing 651 and thus the battery 671 can be charged efficiently. The use of the power storage device of one embodiment of the present invention as the battery 671 has advantages such as a reduction in size.

The structure and operation of the charge and discharge control circuit 670 illustrated in FIG. 6B is described with reference to a block diagram in FIG. 6C. FIG. 6C illustrates the solar cell 660, the battery 671, the DC-DC converter 672, a converter 673, switches SW1 to SW3, and the display portion 652. The battery 671, the DC-DC converter 672, the converter 673, and the switches SW1 to SW3 correspond to the charge and discharge control circuit 670 in FIG. 6B.

First, an example of operation in the case where electric power is generated by the solar cell 660 using external light is described. The voltage of electric power generated by the solar cell 660 is raised or lowered by the DC-DC converter 672 so that the electric power has a voltage for charging the battery 671. Then, when the electric power from the solar cell 660 is used for the operation of the display portion 652, the switch SW1 is turned on and the voltage of the electric power is raised or lowered by the converter 673 to be a voltage needed for the display portion 652. In addition, when display on the display portion 652 is not performed, the switch SW1 is turned off and the switch SW2 is turned on so that the battery 671 is charged.

Here, the solar cell 660 is described as an example of a power generation method; however, there is no particular limitation on the power generation method, and the battery 671 may be charged with another power generation method such as a piezoelectric element or a thermoelectric conversion element (Peltier element). For example, the battery 671 may be charged with a non-contact power transmission module capable of performing charging by transmitting and receiving electric power wirelessly (without contact), or any of the other charge means used in combination.

Figure 6C:
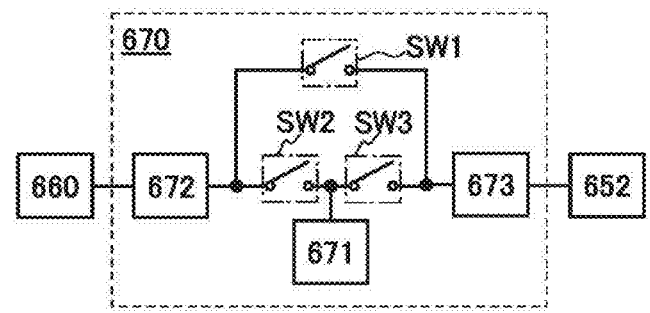

It is needless to say that one embodiment of the present invention is not limited to the electrical device illustrated in FIGS. 6A to 6C as long as the electrical device is includes the power storage device described in any of the above embodiments.

This application is based on Japanese Patent Application serial no. 2013-029527 filed with Japan Patent Office on Feb. 18, 2013, the entire contents of which are hereby incorporated by reference.

What is claimed is:

1. A sodium-ion secondary battery comprising:
an electrode comprising:
   an active material comprising sodium;
   graphene; and
   a binder,
wherein a ratio of the graphene to total weight of the active material, the graphene and the binder is more than or equal to 0.3 wt % and less than or equal to 0.8 wt % in the electrode,
wherein the active material has a band gap of 3.0 eV or more, and
wherein in the graphene, a ratio of oxygen to whole atoms measured by XPS is more than or equal to 2 atomic % and less than or equal to 20 atomic %.

2. The sodium-ion secondary battery according to claim 1, wherein the active material is a polyanionic compound.

3. The sodium-ion secondary battery according to claim 2, wherein the active material is a transition metal sodium phosphate.

4. The sodium-ion secondary battery according to claim 1, wherein the active material comprises one of $Na_3Ti_2(PO_4)_2F_3$, $Na_3V_2(PO_4)_2F_3$, $Na_3Fe_2(PO_4)_2F_3$, $Na_2FePO_4F$, $Na_2MnPO_4F$, $NaNi_3(PO_4)_2P_2O_7$, $NaCo_3(PO_4)_2P_2O_7$ and $NaMn_3(PO_4)_2P_2O_7$.

5. The sodium-ion secondary battery according to claim 1, wherein a particle diameter of the active material is greater than or equal to 50 nm and less than or equal to 500 nm.

6. The sodium-ion secondary battery according to claim 1, wherein in the graphene, the ratio of oxygen is more than or equal to 3 atomic % and less than or equal to 15 atomic %.

7. An electrical device comprising the sodium-ion secondary battery according to claim 1.

8. A sodium-ion secondary battery comprising:
an electrode comprising:
   an active material comprising sodium;
   multilayer graphene including two or more and a hundred or less layers; and
   a binder,
wherein a ratio of the multilayer graphene to total weight of the active material, the multilayer graphene and the binder is more than or equal to 0.3 wt % and less than or equal to 0.8 wt % in the electrode,
wherein the active material has a band gap of 3.0 eV or more, and
wherein in the multilayer graphene, a ratio of oxygen to whole atoms measured by XPS is more than or equal to 2 atomic % and less than or equal to 20 atomic %.

9. The sodium-ion secondary battery according to claim 8, wherein the active material is a polyanionic compound.

10. The sodium-ion secondary battery according to claim 8, wherein the active material is a transition metal sodium phosphate.

11. The sodium-ion secondary battery according to claim 8, wherein the active material comprises one of $Na_3Ti_2(PO_4)_2F_3$, $Na_3V_2(PO_4)_2F_3$, $Na_3Fe_2(PO_4)_2F_3$, $Na_2FePO_4F$, $Na_2MnPO_4F$, $NaNi_3(PO_4)_2P_2O_7$, $NaCo_3(PO_4)_2P_2O_7$ and $NaMn_3(PO_4)_2P_2O_7$.

12. The sodium-ion secondary battery according to claim 8, wherein a particle diameter of the active material is greater than or equal to 50 nm and less than or equal to 500 nm.

13. The sodium-ion secondary battery according to claim 8, wherein in the multilayer graphene, the ratio of oxygen is more than or equal to 3 atomic % and less than or equal to 15 atomic %.

14. An electrical device comprising the sodium-ion secondary battery according to claim 8.

15. The sodium-ion secondary battery according to claim 1, further comprising an electrolytic solution comprising a quaternary ammonium cation and any one of $(C_nF_{2n+1}SO_2)_2N^-$, $(C_mF_{2m+1}SO_3)^-$ and $CF_2(CF_2SO_2)_2N^-$,
wherein n represents 0 to 4, and
wherein m represents 0 to 4.

16. The sodium-ion secondary battery according to claim 8, further comprising an electrolytic solution comprising a quaternary ammonium cation and any one of $(C_nF_{2n+1}SO_2)_2N^-$, $(C_mF_{2m+1}SO_3)^-$ and $CF_2(CF_2SO_2)_2N^-$,
wherein n represents 0 to 4, and
wherein m represents 0 to 4.

* * * * *